United States Patent
Shimamura et al.

(10) Patent No.: US 9,787,906 B2
(45) Date of Patent: Oct. 10, 2017

(54) IMAGE PICKUP DEVICE, IMAGE PROCESSING METHOD, AND RECORDING MEDIUM

(71) Applicant: OLYMPUS CORPORATION, Hachioji-shi, Tokyo (JP)

(72) Inventors: Shogo Shimamura, Tokyo (JP); Kensei Ito, Sagamihara (JP); Maki Toida, Tokyo (JP); Akira Tani, Sagamihara (JP); Manabu Ichikawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/802,505

(22) Filed: Jul. 17, 2015

(65) Prior Publication Data

US 2015/0326790 A1 Nov. 12, 2015

Related U.S. Application Data

(63) Continuation of application No. PCT/JP2014/052065, filed on Jan. 30, 2014.

(30) Foreign Application Priority Data

Feb. 4, 2013 (JP) ................. 2013-019174

(51) Int. Cl.
*H04N 5/222* (2006.01)
*H04N 5/232* (2006.01)
*G06T 3/40* (2006.01)

(52) U.S. Cl.
CPC ....... *H04N 5/23293* (2013.01); *G06T 3/4038* (2013.01)

(58) Field of Classification Search
None
See application file for complete search history.

(56) References Cited

U.S. PATENT DOCUMENTS

2010/0149356 A1* 6/2010 Kim ............. H04N 5/222
348/211.8
2011/0141305 A1 6/2011 Iwamoto
(Continued)

FOREIGN PATENT DOCUMENTS

| JP | 2007-053616 A | 3/2007 |
| JP | 2008-258745 A | 10/2008 |
| JP | 4529561 | 8/2010 |

OTHER PUBLICATIONS

International Search Report mailed in corresponding International Patent Application No. PCT/JP2014/052065 on Apr. 1, 2014, consisting of 3 pp. (English translation provided).

(Continued)

*Primary Examiner* — Stephen Coleman
(74) *Attorney, Agent, or Firm* — Volpe and Koenig, P.C.

(57) ABSTRACT

An image pickup device includes a display unit that includes a plurality of display areas, a display control unit that controls the display unit so that an image displayed in one of the plurality of display areas is changed from a live view image to an image obtained by an image pickup unit in accordance with a shooting instruction when a first reception unit has received the shooting instruction and so that an image displayed in a display area specified by a display position changing instruction is changed to a live view image when a second reception unit has received the display position changing instruction, and an image process unit that synthesizes image data of a plurality of images being displayed in the plurality of display areas and generates image data of a combined image in which the plurality of images are laid out as displayed in the display unit.

10 Claims, 39 Drawing Sheets

(56) References Cited

U.S. PATENT DOCUMENTS

2012/0200738 A1 8/2012 Iwasaki
2012/0243802 A1* 9/2012 Fintel .................. H04N 5/2625
  382/284

OTHER PUBLICATIONS

Extended Search Report issued is corresponding European Application No. 14746887.0 on Oct. 19, 2016, consisting of 7 pp.
Offlice Action issued in corresponding Chinese Application No. 201480006213.3 dated Jul. 3, 2017, consisting of 15 pp. (English Translation Provided).

* cited by examiner

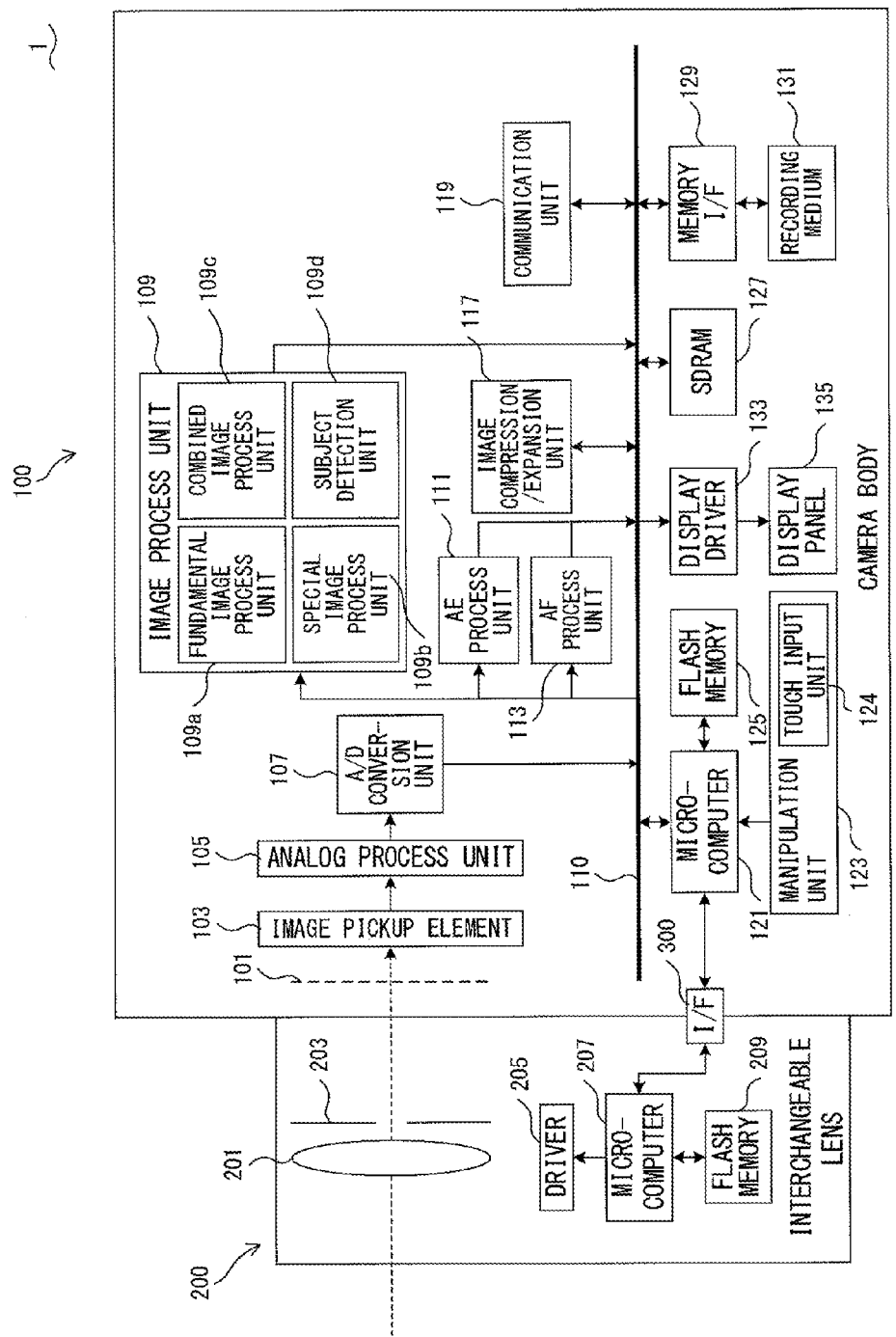
F I G. 1

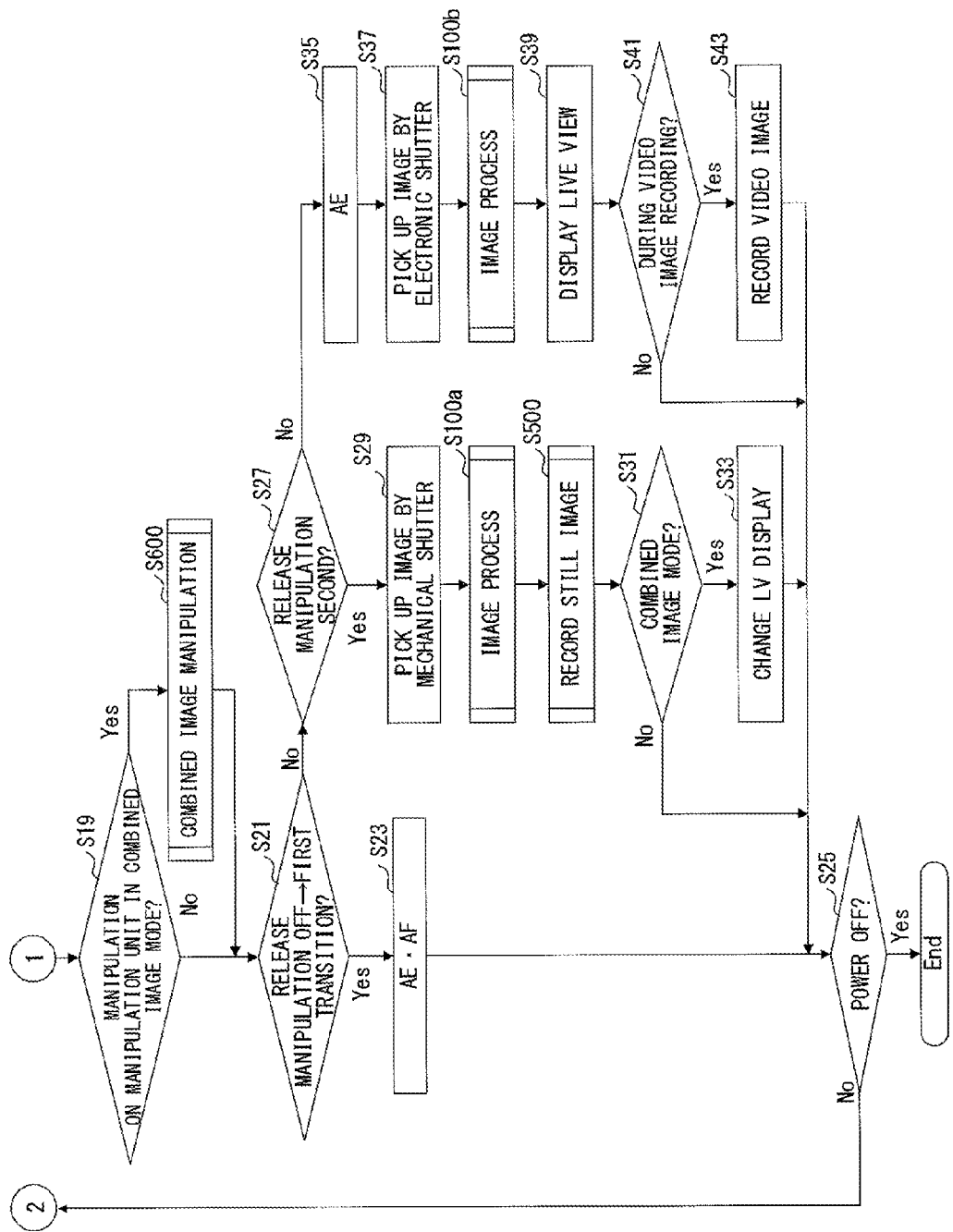
F I G. 2B

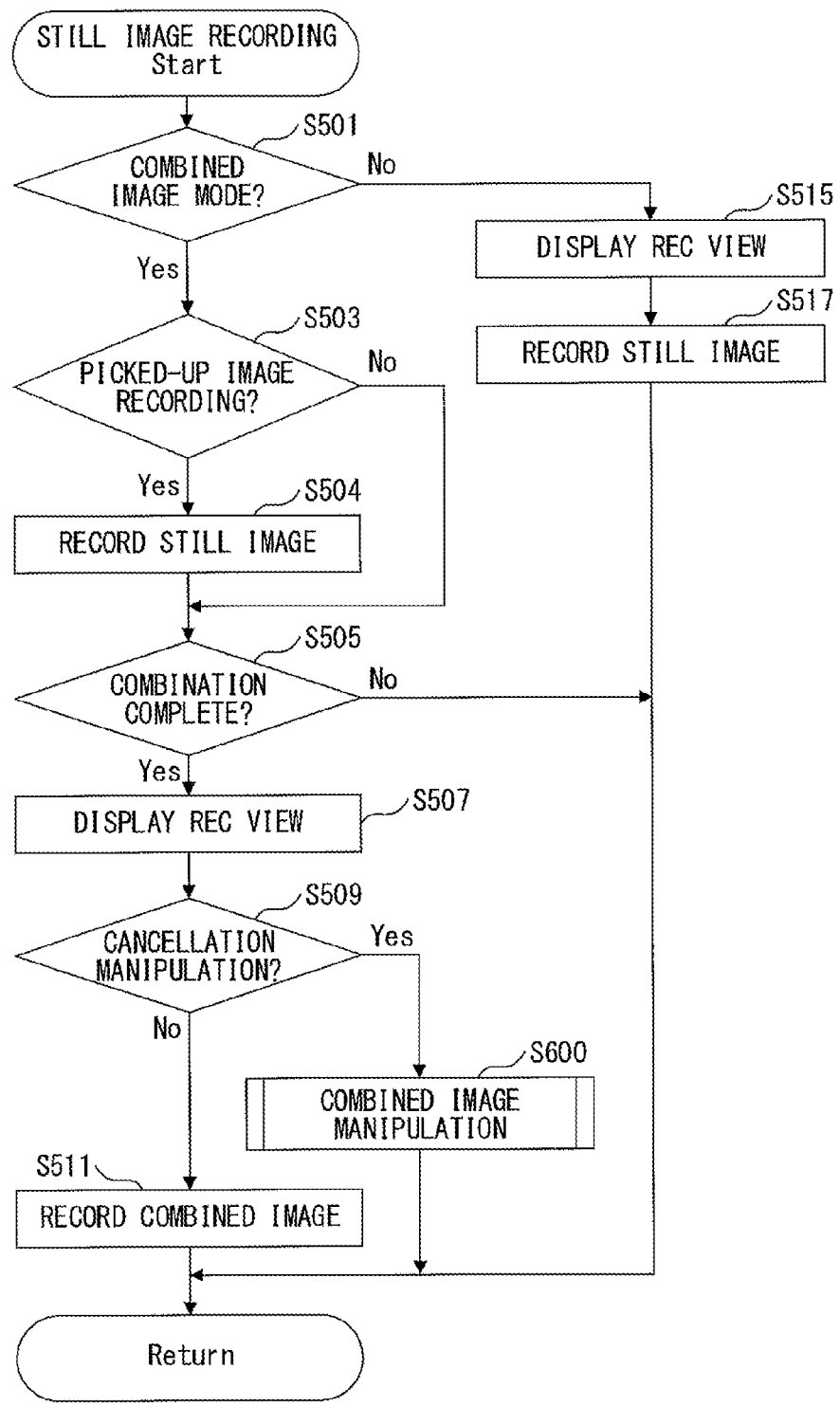
F I G. 7

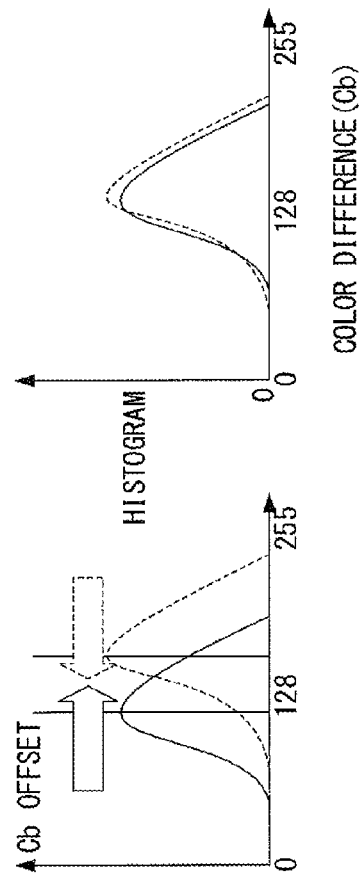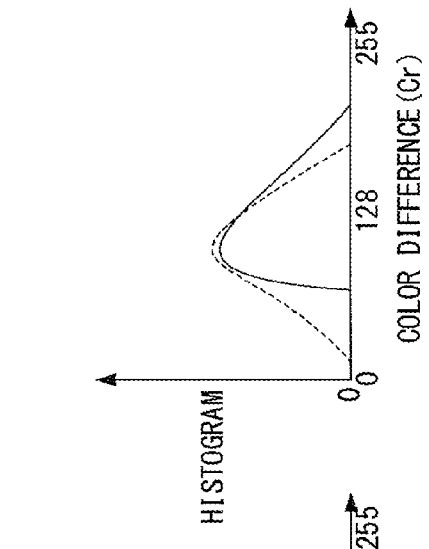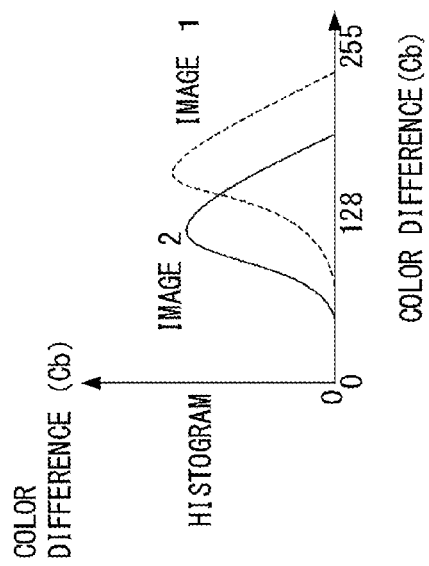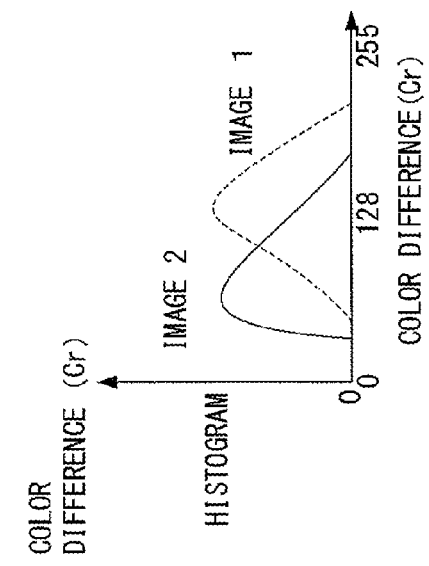
FIG. 16A  FIG. 16B  FIG. 16C
FIG. 16D  FIG. 16E  FIG. 16F

| COMBINED IMAGE STORAGE AREA FOR DISPLAYING AND RECORDING | |
|---|---|
| FRAME IMAGE 1 | |
| FRAME IMAGE 2 | |
| FRAME IMAGE 3 | |
| EMPTY | |
| EMPTY | |
| EMPTY | |
| EMPTY | |
| EMPTY | |

F I G. 20 A

| COMBINED IMAGE STORAGE AREA FOR DISPLAYING AND RECORDING | |
|---|---|
| FRAME IMAGE 1 | |
| EMPTY | |
| FRAME IMAGE 3 | |
| EMPTY | |
| EMPTY | |
| FRAME IMAGE 2 | |
| EMPTY | |
| EMPTY | |

F I G. 20 B

| COMBINED IMAGE STORAGE AREA FOR DISPLAYING AND RECORDING | |
|---|---|
| FRAME IMAGE 1 | |
| FRAME IMAGE 2 | |
| FRAME IMAGE 3 | |
| EMPTY | |
| EMPTY | |
| EMPTY | |
| EMPTY | |
| EMPTY | |

F I G. 20 C

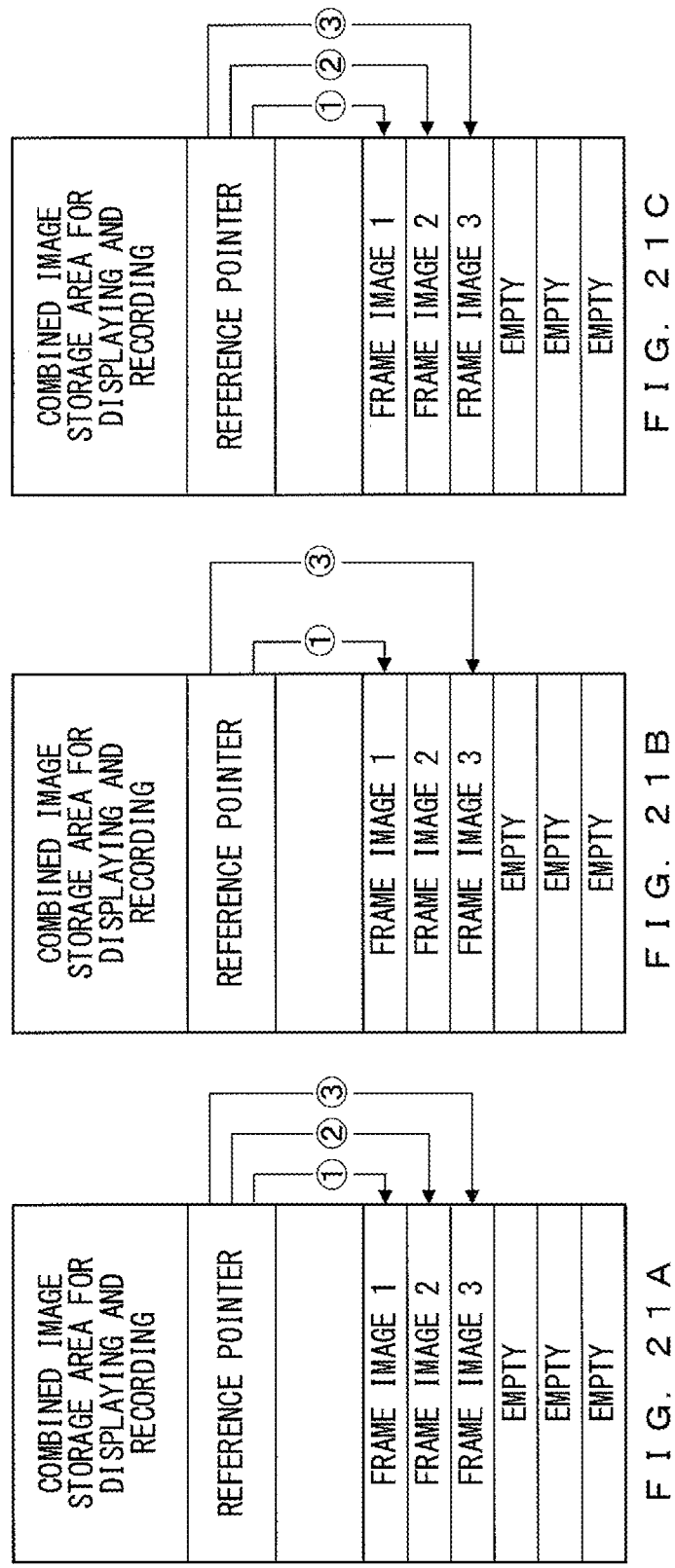

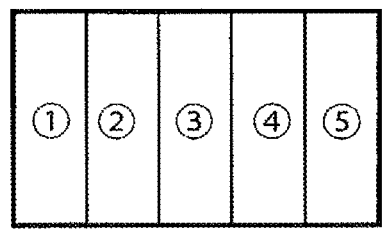
F I G. 2 3 A
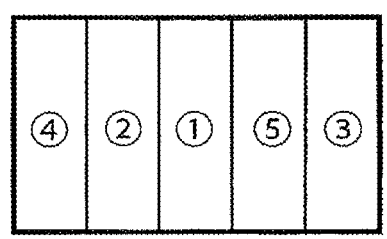
F I G. 2 3 B
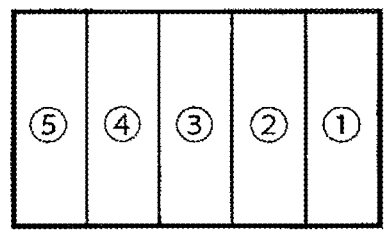
F I G. 2 3 C

F I G. 26A
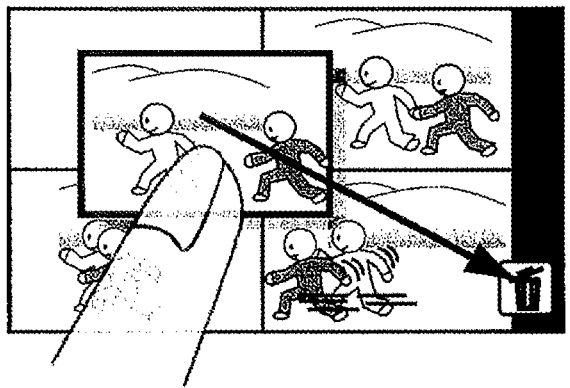
F I G. 26B
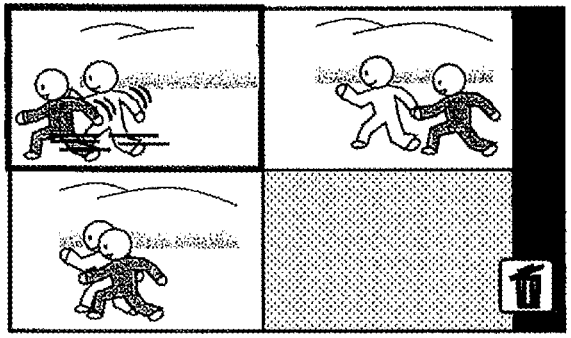

FIG. 27A
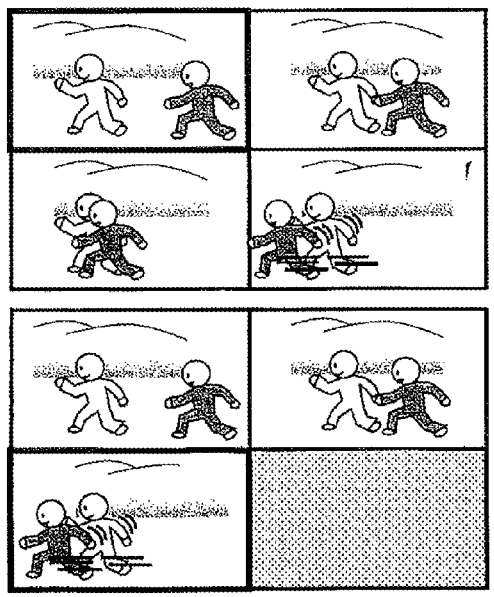
FIG. 27B
CROSS-SHAPED KEY
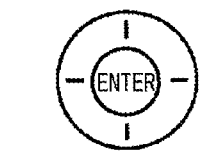
+
TRASH BIN BUTTON
FIG. 27C

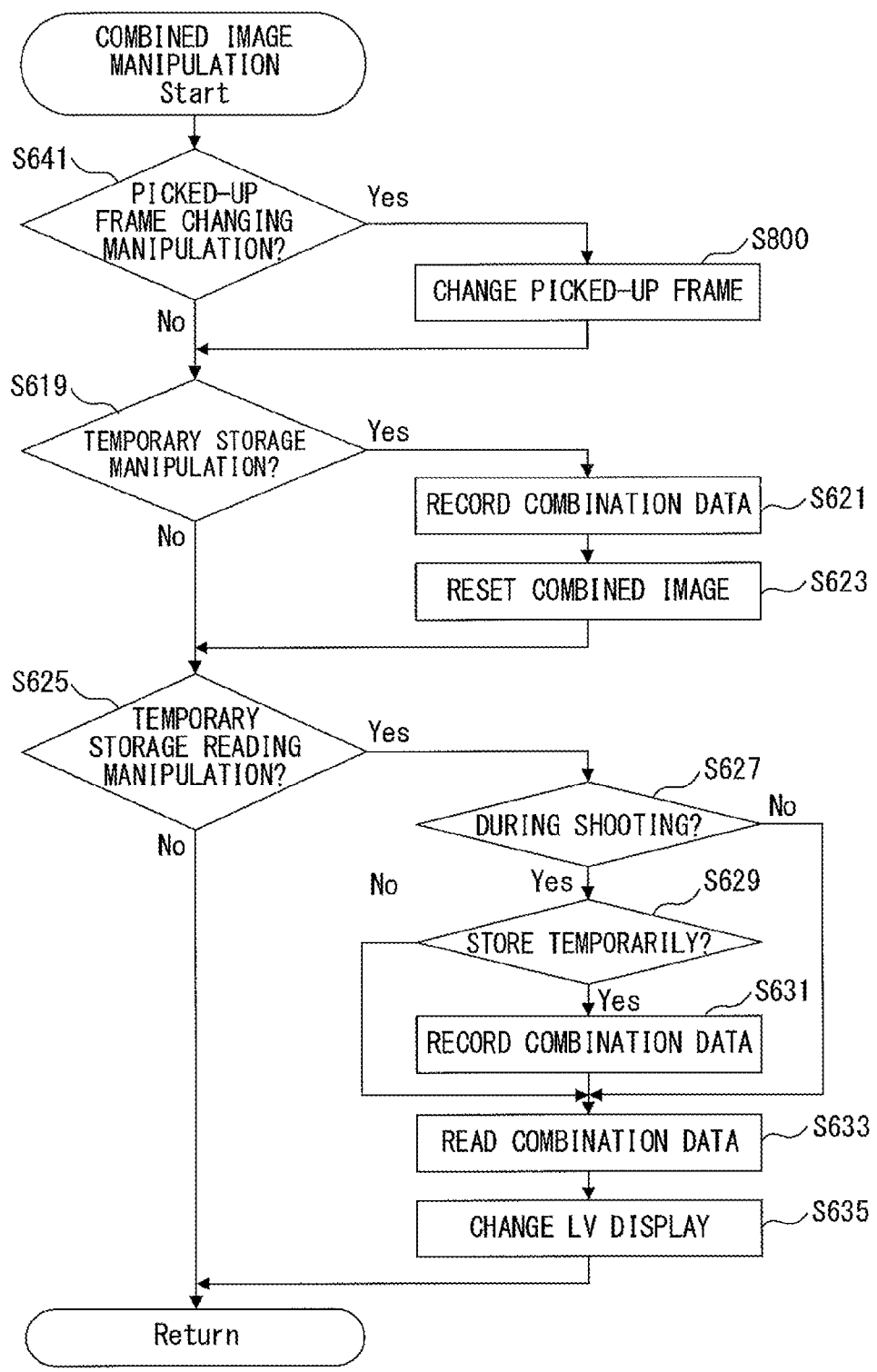
F I G. 3 1

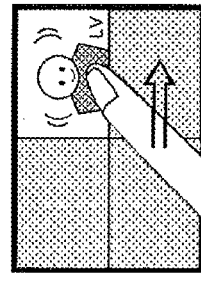
FIG. 34D
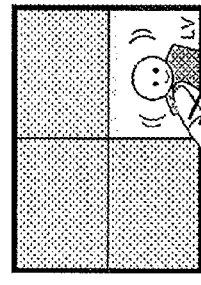
FIG. 34G
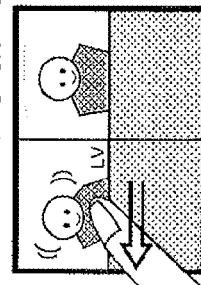
FIG. 34K
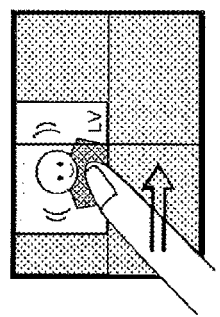
FIG. 34C
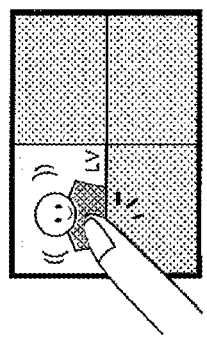
FIG. 34F
FIG. 34J
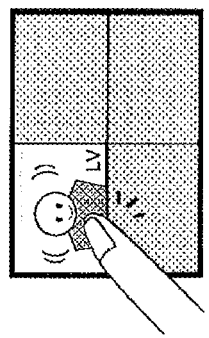
FIG. 34B
FIG. 34E
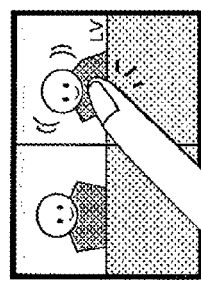
FIG. 34I
FIG. 34A
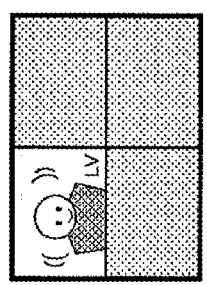
FIG. 34H
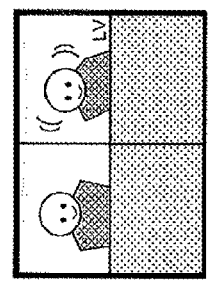

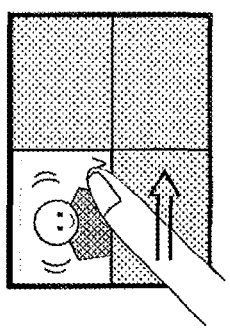
FIG. 35C
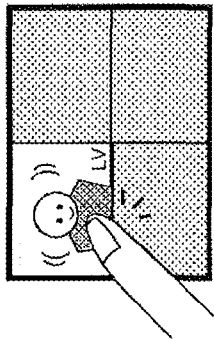
FIG. 35D
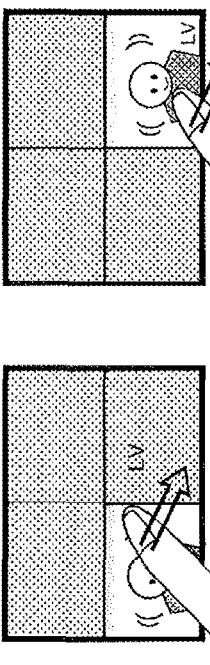
FIG. 35E
FIG. 35F
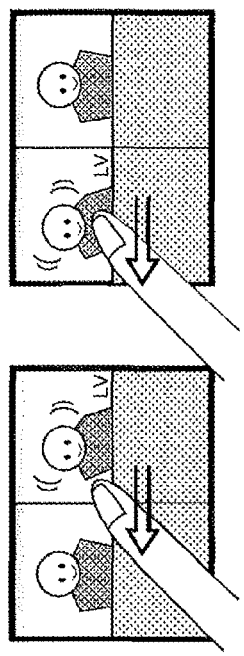
FIG. 35G
FIG. 35J
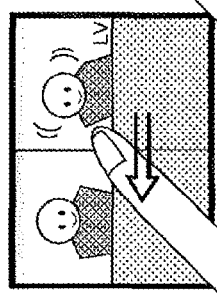
FIG. 35K
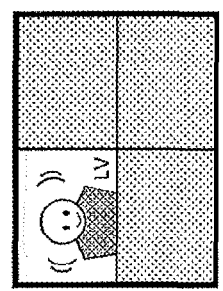
FIG. 35B
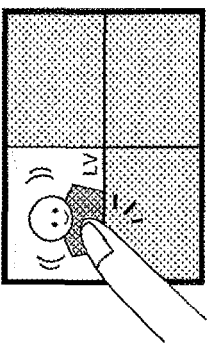
FIG. 35I
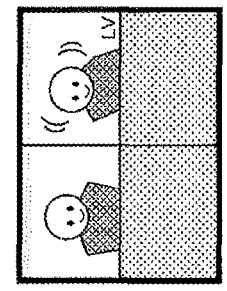
FIG. 35A
FIG. 35H

IMAGE PICKUP DEVICE, IMAGE PROCESSING METHOD, AND RECORDING MEDIUM

CROSS-REFERENCE TO RELATED APPLICATIONS

This application is based upon and claims the benefit of priority of the prior Japanese Patent Application No. 2013-19174, filed Feb. 4, 2013, the entire contents of which are incorporated herein by reference.

This is a Continuation Application of PCT Application No. PCT/JP2014/052065, filed Jan. 30, 2014, which was not published under PCT Article 21(2) in English.

FIELD

The present invention is related to an image pickup device, an image processing method, and a recording medium that lay out a plurality of images obtained through a plurality of times of shooting and generate image data of a combined image that exists as a single image.

BACKGROUND

In an image pickup device such as a digital camera, a digital video camera, etc. it is easy to process obtained images because obtained images are stored or recorded as digital data.

One application of an image pickup device that utilizes the above feature is a combined photograph. A combined photograph is a photograph synthesized by laying out a plurality of photographs that have been obtained through a plurality of times of shooting.

More specifically, a combined photograph including a plurality of images is generated so that the photographer expresses the feelings or imagination of the moment of the shooting from images expressing the stereoscopic feeling based on different scenes and different viewpoints, from images picked up as time elapses and from picked-up images capturing the movements of a subject. Thereby, the combined image is intended to convey, to those who look at the photograph, feelings or imagination.

In order to accomplish this purpose, there is a scenario for a method and order of arranging photographs and such a scenario is very important for arousing emotions of those who look at the photographs.

Image pickup devices that obtain combined photographs are roughly categorized into two groups; those that obtain a plurality of photographs constituting a combined photograph in one shutter manipulation as disclosed in for example Patent Document 1 (Japanese Laid-open Patent Publication No. 2007-053616), and those that obtain a plurality of photographs constituting a combined photograph in shutter manipulations that respectively correspond to the plurality of photographs as disclosed in for example Patent Document 2 (Japanese Patent No. 4529561).

Note that Patent Document 1 discloses a digital camera that continuously picks up images for a plurality of frames and displays the images of the plurality of frames in a listed manner.

Patent Document 2 discloses an image pickup device that synthesizes and records optimum images which have each been selected for each subject from among a plurality of images of different subjects, the plurality of images having been picked up for each of those subjects.

Incidentally, in order to obtain a desired combined photograph, it is desirable that when the image data is generated for a combined photograph, the arrangement positions of photographs constituting the combined photograph be able to be changed easily by the users of the image pickup device in accordance with preference.

SUMMARY

An aspect of the present invention provides an image pickup device including a display unit including a plurality of display areas, a first reception unit that receives a shooting instruction, a second reception unit that receives a display position changing instruction specifying a display area of the display unit, an image pickup unit that obtains an image by picking up the image of a subject, a display control unit that controls the display unit so that an image displayed in one of the plurality of display areas is changed from a live view image to an image obtained by the image pickup unit in accordance with a shooting instruction when the first reception unit has received the shooting instruction and so that an image displayed in a display area specified by the display position changing instruction is changed to a live view image when the second reception unit has received the display position changing instruction, and an image process unit that synthesizes image data of a plurality of images being displayed in the plurality of display areas and generates image data of a combined image in which the plurality of images are laid out as displayed in the display unit.

Another aspect of the present invention provides an image processing method including a step of displaying a live view image in one or a plurality of display areas of a display unit, a step of receiving a shooting instruction, a step of obtaining an image of a subject in accordance with the shooting instruction, a step of changing an image displayed in one of the one or a plurality of display areas from a live view image to an image obtained in accordance with the shooting instruction, a step of receiving a display position changing instruction specifying a display area of the display unit, a step of changing an image displayed in a display area specified by the display position changing instruction to a live view image, and a step of synthesizing image data of a plurality of images being displayed in a plurality of display areas of the display unit and generating image data of a combined image in which the plurality of images are laid out as displayed in the display unit.

Yet another aspect of the present invention provides a non-transitory computer-readable recording medium storing an image processing program that causes a computer provided with a display unit including a plurality of display areas to execute: a step of displaying a live view image in one or a plurality of display areas of the display unit, a step of receiving a shooting instruction, a step of obtaining an image of a subject in accordance with the shooting instruction, a step of changing an image displayed in one of the one or a plurality of display areas from a live view image to an image obtained in accordance with the shooting instruction, a step of receiving a display position changing instruction specifying a display area of the display unit, a step of changing an image displayed in a display area specified by the display position changing instruction to a live view image, and a step of synthesizing image data of a plurality of images being displayed in a plurality of display areas of the display unit and generating image data of a combined image in which the plurality of images are laid out as displayed in the display unit.

BRIEF DESCRIPTION OF DRAWINGS

FIG. 1 is a block diagram showing an entire configuration mainly of the electric system of a camera according to example 1 of the present invention;

FIG. 2B is a flowchart (Part 2) showing the entire process of the camera according to example 1 of the present invention;

FIG. 7 is a flowchart showing a still image recording process of the camera according to example 1 of the present invention;

FIG. 16A is a first figure for explaining a color changing process executed by a combined image process unit of the camera according to example 1 of the present invention;

FIG. 16B is a second figure for explaining the color changing process executed by the combined image process unit of the camera according to example 1 of the present invention;

FIG. 16C is a third figure for explaining the color changing process executed by the combined image process unit of the camera according to example 1 of the present invention;

FIG. 16D is a fourth figure for explaining the color changing process executed by the combined image process unit of the camera according to example 1 of the present invention;

FIG. 16E is a fifth figure for explaining the color changing process executed by the combined image process unit of the camera according to example 1 of the present invention;

FIG. 16F is a sixth figure for explaining the color changing process executed by the combined image process unit of the camera according to example 1 of the present invention;

FIG. 20A is a first figure for explaining retraction of frame image data based on a cancellation manipulation and restoration of frame image data based on a restoration manipulation of the camera according to example 1 of the present invention;

FIG. 20B is a second figure for explaining retraction of frame image data based on a cancellation manipulation and restoration of frame image data based on a restoration manipulation of the camera according to example 1 of the present invention;

FIG. 20C is a third figure for explaining retraction of frame image data based on a cancellation manipulation and restoration of frame image data based on a restoration manipulation of the camera according to example 1 of the present invention;

FIG. 21A is another first figure for explaining retraction of frame image data based on a cancellation manipulation and restoration of frame image data based on a restoration manipulation of the camera according to example 1 of the present invention;

FIG. 21B is another second figure for explaining retraction of frame image data based on a cancellation manipulation and restoration of frame image data based on a restoration manipulation of the camera according to example 1 of the present invention;

FIG. 21C is another third figure for explaining retraction of frame image data based on a cancellation manipulation and restoration of frame image data based on a restoration manipulation of the camera according to example 1 of the present invention;

FIG. 23A is a first figure for showing relationships between the display areas and the shooting order of the camera according to example 1 of the present invention;

FIG. 23B is a second figure for showing relationships between the display areas and the shooting order of the camera according to example 1 of the present invention;

FIG. 23C is a third figure for showing relationships between the display areas and the shooting order of the camera according to example 1 of the present invention;

FIG. 26A is still another first figure for explaining a cancellation manipulation of the camera according to example 1 of the present invention;

FIG. 26B is still another second figure for explaining a cancellation manipulation of the camera according to example 1 of the present invention;

FIG. 27A is still another first figure for explaining a cancellation manipulation of the camera according to example 1 of the present invention;

FIG. 27B is still another second figure for explaining a cancellation manipulation of the camera according to example 1 of the present invention;

FIG. 27C is still another third figure for explaining a cancellation manipulation of the camera according to example 1 of the present invention;

FIG. 31 is a flowchart showing a combined image manipulation process of a camera according to example 2 of the present invention;

FIG. 34A is a first figure for explaining a picked-up frame changing manipulation of the camera according to example 2 of the present invention;

FIG. 34B is a second figure for explaining a picked-up frame changing manipulation of the camera according to example 2 of the present invention;

FIG. 34C is a third figure for explaining a picked-up frame changing manipulation of the camera according to example 2 of the present invention;

FIG. 34D is a forth figure for explaining a picked-up frame changing manipulation of the camera according to example 2 of the present invention;

FIG. 34E is a fifth figure for explaining a picked-up frame changing manipulation of the camera according to example 2 of the present invention;

FIG. 34F is a sixth figure for explaining a picked-up frame changing manipulation of the camera according to example 2 of the present invention;

FIG. 34G is a seventh figure for explaining a picked-up frame changing manipulation of the camera according to example 2 of the present invention;

FIG. 34H is an eighth figure for explaining a picked-up frame changing manipulation of the camera according to example 2 of the present invention;

FIG. 34I is a ninth figure for explaining a picked-up frame changing manipulation of the camera according to example 2 of the present invention;

FIG. 34J is a tenth figure for explaining a picked-up frame changing manipulation of the camera according to example 2 of the present invention;

FIG. 34K is an eleventh figure for explaining a picked-up frame changing manipulation of the camera according to example 2 of the present invention;

FIG. 35A is another first figure for explaining a picked-up frame changing manipulation of the camera according to example 2 of the present invention;

FIG. 35B is another second figure for explaining a picked-up frame changing manipulation of the camera according to example 2 of the present invention;

FIG. 35C is another third figure for explaining a picked-up frame changing manipulation of the camera according to example 2 of the present invention;

FIG. 35D is another forth figure for explaining a picked-up frame changing manipulation of the camera according to example 2 of the present invention;

FIG. 35E is another fifth figure for explaining a picked-up frame changing manipulation of the camera according to example 2 of the present invention;

FIG. 35F is another sixth figure for explaining a picked-up frame changing manipulation of the camera according to example 2 of the present invention;

FIG. 35G is another seventh figure for explaining a picked-up frame changing manipulation of the camera according to example 2 of the present invention;

FIG. 35H is another eighth figure for explaining a picked-up frame changing manipulation of the camera according to example 2 of the present invention;

FIG. 35I is another ninth figure for explaining a picked-up frame changing manipulation of the camera according to example 2 of the present invention;

FIG. 35J is another tenth figure for explaining a picked-up frame changing manipulation of the camera according to example 2 of the present invention; and FIG. 35K is another eleventh figure for explaining a picked-up frame changing manipulation of the camera according to example 2 of the present invention.

DESCRIPTION OF EMBODIMENTS

Figure 2A:
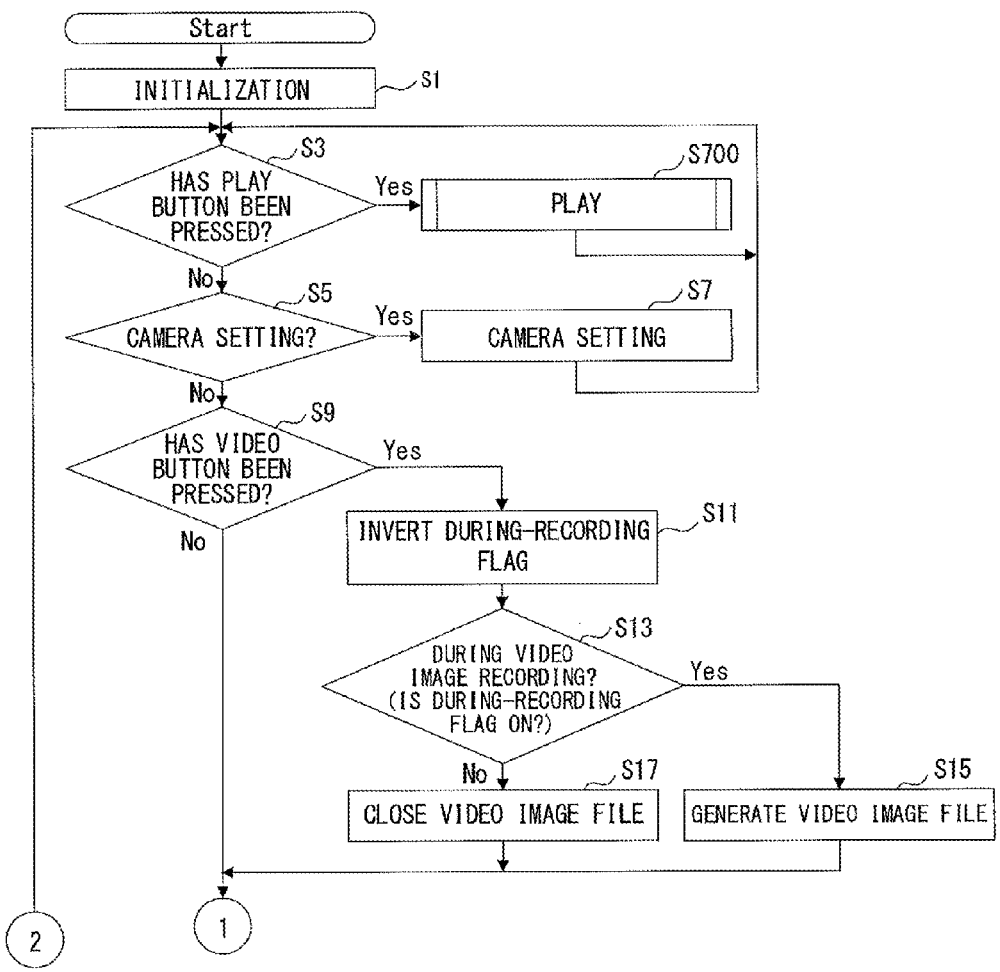
FIG. 2A is a flowchart (Part 1) showing the entire process of the camera according to example 1 of the present invention.

Hereinafter, by referring to the drawings, explanations will be given for the respective examples of the present invention. Note that in the present document, live view images are images obtained as needed by the live view function etc. of a camera (an example of an image pickup device) differently from images obtained in response to a clear instruction to shoot a photograph given by users of the camera, such as the pressing of a releasing manipulation etc.

Example 1

FIG. 1 is a block diagram showing an entire configuration mainly of the electric system of a camera according to the present example.

A camera 1 exemplified in FIG. 1 is an image pickup device that stores or records an obtained image as digital data. Users of the camera 1 can give an instruction to obtain an image via the releasing manipulation that uses a manipulation unit 123 while observing the live view image displayed on a display panel 135, which is the display unit.

Note that the camera 1 also includes a function of obtaining a combined image that is made by laying out a plurality of still images or video images in addition to the function of obtaining a still image (i.e., a photograph) and a video image.

First, by referring to FIG. 1, explanations will be given for the configuration of the camera 1. The camera 1 includes a camera body 100 and an interchangeable lens 200 that is detachable from the camera body 100 and that includes an image pickup lens 201. Note that while a configuration of a camera having an interchangeable lens is exemplified, the image pickup lens may be fixed to the camera body.

The interchangeable lens 200 includes the image pickup lens 201, a diaphragm 203, a driver 205, a microcomputer 207 and a flash memory 209. The camera body 100 and the interchangeable lens 200 are connected via an interface (referred to as an I/F hereinafter) 300.

The image pickup lens 201 includes one or a plurality of optical lenses for forming a subject image, and is a single focus lens or a zoom lens. On a later stage along the optical axis of the image pickup lens 201, the diaphragm 203 is disposed. The aperture diameter of the diaphragm 203 is variable and controls the amount of light of the subject flux passing through the image pickup lens 201.

Also, the image pickup lens 201 can be moved in the flux directions by the driver 205. On the basis of a control signal from the microcomputer 207, the point of focus of the image pickup lens 201 is controlled, and the focal length of the image pickup lens 201 is also controlled when the image pickup lens 201 is a zoom lens. The driver 205 also controls the aperture diameter of the diaphragm 203.

The microcomputer 207 connected to the driver 205 is connected to the I/F 300 and the flash memory 209. The microcomputer 207 operates in accordance with a program stored in the flash memory 209. The microcomputer 207 operating in accordance with a program communicates with a microcomputer 121 in the camera body 100, which will be described later, and controls the interchangeable lens 200 on the basis of a control signal from the microcomputer 121.

In the flash memory 209, in addition to the above program, various types of information such as the optical characteristics, adjustment values, etc. of the interchangeable lens 200 are stored. The I/F 300 is an interface for conducting mutual communications between the microcomputer 207 in the interchangeable lens 200 and the microcomputer 121 in the camera body 100.

In the camera body 100, a mechanical shutter 101 is disposed on the optical axis of the image pickup lens 201. The mechanical shutter 101 shuts off the subject flux so as to control the period of time during which an image pickup element 103, which will be described later, is exposed to the subject flux, and for example a known focal plane shutter etc. can be employed for the mechanical shutter 101. The image pickup element 103 is arranged at the position, behind the mechanical shutter 101, at which the subject image is formed by the image pickup lens 201.

On the image pickup element 103, photo diodes constituting respective pixels are arranged two dimensionally in a matrix. Each of the photo diodes generates photoelectric conversion current on the basis of the amount of the received light, and the photoelectric conversion current is subjected to charge accumulation by capacitors connected to the photodiodes. RGB filters of a Bayer arrangement are arranged on the front faces of the respective pixels. Note that the configuration of the image pickup element 103 is not limited to a configuration having RGB filters in the Bayer arrangement and may be a configuration in which a plurality of sensors are arranged in the thickness direction of the element, such as for example FOVEON (a registered trademark of Foveon, Inc.).

The image pickup element 103 is connected to an analog process unit 105. The analog process unit 105 shapes the waveform of a photoelectric conversion signal read from the image pickup element 103 (referred to as an analog image signal hereinafter) after reducing reset noise, etc., and increases gain so that an appropriate luminance is obtained. The analog process unit 105 is connected to an A/D conversion unit 107. The A/D conversion unit 107 conducts analog-digital conversion on an analog image signal and outputs the obtained digital image signal (referred to as image data hereinafter) to a bus 110 so as to make an SDRAM 127 store it. In other words, in the camera 1, the image pickup element 103, the analog process unit 105, and the A/D conversion unit 107 function as an image pickup unit that picks up an image of a subject so as to obtain the image of the subject. Note that raw image data before receiving an image process by an image process unit 109 is referred to as RAW data in this document.

The image pickup element 103 has an electronic shutter and picks up images by using the electronic shutter by keeping the mechanical shutter 101 open when shooting is conducted repeatedly such as in a case of shooting a video image or shooting a live view image.

The bus 110 is a transfer channel for transferring, to the inside of the camera body 100, various types of data read or generated in the camera body 100. To the bus 110, an image process unit 109, an AE (Auto Exposure) process unit 111, an AF (Auto Focus) process unit 113, an image compression/expansion unit 117, a communication unit 119, a microcomputer 121, an SDRAM (Synchronous DRAM) 127, a memory interface (referred to as a memory I/F hereinafter) 129, and a display driver 133, in addition to the A/D conversion unit 107, are connected.

The image process unit 109 includes a fundamental image process unit 109a that executes a fundamental image process, a special image process unit 109b that applies special effects when a mode that applies special effects such as an art filter etc. has been set, a combined image process unit 109c that generates image data for a combined image, and a subject detection unit 109d that detects a subject by analyzing image data by using a pattern matching process etc. The image process unit 109 reads image data temporarily stored in the SDRAM 127 and executes an image process on the image data.

The fundamental image process unit 109a executes, on RAW data, an optical black (OB) subtraction process, a white balance (WB) correction process, and a synchronization process, a color reproduction process, a gamma correction process, a luminance changing process, an edge enhancement process, a noise reduction (NR) process that are executed in a case of Bayer data, and other process.

The special image process unit 109b executes, on image data processed by the fundamental image process unit 109a, a special image process that applies various visual special effects on the basis of a special effect (art filter) etc. that has been set. For example, when the toy photo mode has been set as a mode of a special effect (art filter), a process of applying shading is executed.

Also, when the fantastic focus mode, the rough monochrome mode, the diorama mode or the crystal mode is set, a soft focus process, a noise superimposition process, a blurring process, or a cross filter process is executed respectively on image data.

The combined image process unit 109c synthesizes a plurality of pieces of image data and generates image data of a combined image, which is an image in which a plurality of images corresponding to the plurality of pieces of image data are laid out at prescribed positions. The plurality of synthesized pieces of image data are image data processed by at least the fundamental image process unit 109a, and when a special effect has been set, pieces of image data processed by the fundamental image process unit 109a and the special image process unit 109b are synthesized.

Also, before executing the process of synthesizing the pieces of image data, the fundamental image process unit 109c corrects respective images that constitute a combined image and that were processed by the fundamental image process unit 109a and the special image process unit 109b (also referred to as frame images hereinafter). Specifically, the combined image process unit 109c analyzes a plurality of pieces of image data processed by the fundamental image process unit 109a and the special image process unit 109b and calculates a difference in the color distribution, a difference in the average luminance, etc. between the images.

Then, on the basis of the calculated information, the colors and the luminance average of the respective frame images constituting the combined image are corrected in such a manner that the combined image enters the optimum state. By correcting frame images so as to execute an adjustment process between images, it is possible to obtain a better image as a combined image.

The subject detection unit 109d executes a process of detecting a prescribed subject such as for example a human face or an animal such as a pet through an image analysis that employs a pattern matching technique etc. It is also possible for the subject detection unit 109d to further execute a process of calculating the type, the size, the position, etc. of the detected subject. These detection results are utilized for example switching of shooting modes, autofocus, autozoom, which picks up a subject image to a prescribed size, etc.

The AE process unit 111 measures the subject luminance on the basis of image data input via the bus 110 and outputs the measured subject luminance information to the microcomputer 121 via the bus 110.

While a configuration in which the AE process unit 111 calculates a subject luminance on the basis of image data is used in this example, the camera 1 may realize a similar function by being provided with a photometric sensor dedicated to the measurement of the subject luminance.

The AF process unit 113 extracts a signal having high-frequency components from the image data and obtains the focus evaluation value by an integration process. The AF process unit 113 outputs the obtained focus evaluation value to the microcomputer 121 via the bus 110. In other words, the cameral adjusts the focus of the image pickup lens 201 by using a so-called contrast method.

When image data is recorded in a recording medium 131 connected to the memory I/F 129, the image compression/expansion unit 117 compresses image data read from the SDRAM 127 in accordance with various types of compression schemes such as a JPEG compression scheme etc. in a case of still images and an MPEG scheme etc. in a case of video images.

The microcomputer 121 adds a header necessary for configuring a JPEG file, an MPO file or an MPEG file to JPEG image data or MPEG image data so as to generate the JPEG file, the MPO file or the MPEG file. The microcomputer 121 records the generated file in the recording medium 131 via the memory I/F 129.

The image compression/expansion unit 117 also expands jpeg image data and mpeg image data for playing and displaying the image. For expansion, a file recorded in the recording medium 131 is read and receives an expansion process by the image compression/expansion unit 117, and the expanded image data is stored in the SDRAM 127 temporarily. While the present example shows an example in which a jpeg compression scheme or an mpeg compression scheme is employed as an image compression scheme, compression schemes are not limited to these examples and other compression schemes such as TIFF, H.264, etc. may also be employed.

The communication unit 119 communicates with an external device for the updating or addition of a template stored in a flash memory 125, which will be described later. The communication unit 119 may be connected with an external device via a wired LAN or a wireless LAN, and may also be connected to an external device via a USB cable, etc.

The microcomputer 121 functions as a control unit of the entire camera 1 and controls various types of sequences of the camera in a general manner. To the microcomputer 121, the manipulation unit 123 and the flash memory 125 are connected in addition to the I/F 300 described above.

The manipulation unit 123 includes manipulation members of various types of input buttons, input keys, etc., such as a power button, a release button, a video button, a play button, a menu button, a cross-shaped button, an OK button, a mode dial, etc., and detects manipulation states of these manipulation members so as to output detection results to the microcomputer 121.

The microcomputer 121 executes various types of sequences in accordance with manipulation by users on the basis of detection results of the manipulation members from the manipulation unit 123. In other words, in the camera 1, the manipulation unit 123 functions as a reception unit that receives various types of instructions (for example a shooting instruction, a cancellation instruction, a restoration instruction, a playing instruction) from users.

The power button is a manipulation member for giving instructions about turning on/off of the power of the camera 1. When the power button is pressed, the power of the camera 1 is turned on and when the power button is pressed again, the power of the camera 1 is turned off.

The release button is connected to a first release switch, which is turned on when it is pressed halfway, and a second release switch, which is turned on when it is pressed fully from the halfway-pressed state. When the second release button is turned on, the microcomputer 121 executes shooting preparation sequences such as the AE operation, the AF operation, etc.

Also, when the second release switch is turned on, a series of shooting sequences is conducted in which the mechanical shutter 101 etc. is controlled, image data based on a subject image is obtained from the image pickup element 103 etc., and this image data is recorded in the recording medium 131.

The play button is a manipulation button for setting and cancelling the playing mode, and when the playing mode has been set, image data of images that was picked up is read from the recording medium 131 so as to play and display the image on a display panel 135.

The menu button is a manipulation button for making the display panel 135 display a menu window. On the menu window, various types of camera settings can be performed. Camera settings include setting of special effects (art filter). Special effects include fantastic focus, pop art, toy photo, rough monochrome, diorama, etc. In addition to these, it is also possible to conduct setting of combined images on the menu window.

The mode dial is a dial for selecting a shooting mode. In the camera 1, when the mode dial is manipulated, the operation mode is switched between the normal mode, which conducts normal shooting, and the combined image mode, which conducts shooting of combined images. The switching between the normal mode and the combined image mode may also be conducted from the menu window etc.

The manipulation unit 123 further includes a touch input unit 124. The touch input unit 124 is for example a touch panel sensor disposed on the display panel 135. The touch input unit 124 detects a touch manipulation on the display panel 135 by users and outputs the detection results to the microcomputer 121. The microcomputer 121 executes various types of sequences in accordance with manipulations by users in accordance with the detection results of the touch input unit 124 from the manipulation unit 123.

The manipulation unit 123 may have the above various types of buttons on the display panel 135. In other words, it is also possible to display the buttons on the display panel 135 instead of physically providing buttons on the surface of the camera 1 so that the touch input unit 124 detects a manipulation on the buttons displayed on the display panel 135.

It is also possible to make the display panel 135 function as the release button instead of displaying the release button on the display panel 135. In such a case, it is also possible to treat the state in which the display panel 135 is touched as the state in which the release button is pressed halfway so as to treat the state in which the display panel 135 has been in a touched state for a prescribed period of time (one second for example) or longer as the state in which the release button is pressed fully or to treat the state in which the display panel 135 is touched as the state in which the release button is pressed halfway and is pressed fully.

The flash memory 125 is a non-volatile storage medium that stores programs for executing various types of sequences of the microcomputer 121. The microcomputer 121 controls the entire camera on the basis of programs stored in the flash memory 125. The flash memory 125 stores various types of adjustment values for a color matrix coefficient, the R gain and the B gain in accordance with the white balance mode, a gamma table, an exposure condition determination table, etc. Further, the flash memory 125 stores, as templates, styles of combined images, i.e., information etc. as to how to lay out frame images that constitute combined images. A storage recording medium that stores the programs, adjustment values, and templates described above is not limited to a flash memory as long as it is a non-volatile storage medium.

The SDRAM 127 is an electrically rewritable volatile memory that is for temporarily storing image data etc. This SDRAM 127 temporarily stores image data output from the A/D conversion unit 107 and image data processed by the image process unit 109, the image compression/expansion unit 117, etc.

The memory I/F 129 is connected to the recording medium 131. The memory I/F 129 conducts control of writing to the recording medium 131 data such as image data, the header data attached to image data, etc., and reading of such data from the recording medium 131. The recording medium 131 is a recording medium such as for example a memory card etc. that is detachable with respect to the camera body 100; however, the scope of the present invention is not limited to this and a non-volatile memory, a hard disk, etc. embedded in the camera body 100 may also be employed.

The display driver 133 is connected to the display panel 135. The display driver 133 makes the display panel 135 display an image on the basis of image data read from the SDRAM 127 or the recording medium 131 and expanded by the image compression/expansion unit 117. The display panel 135 is for example a liquid crystal display (LCD) provided at the back of the camera body 100 so as to display an image. Displayed images include a rec-view display, in which image data to be recorded is displayed briefly immediately after the picking up of the image, display of an image file of a still image or a video image recorded in the recording medium 131, display of a video image such as live viewing display etc. Note that not only an LCD but also an organic EL display may be the display panel 135, and a different type of display panel may also be used.

Further, in the display panel 135, a plurality of areas for displaying images (referred to as display areas hereinafter) are defined on the display panel 135 when the shooting mode is the combined image mode. Note that the layout of the plurality of display areas is defined by the style of a combined image.

Next, by referring to FIG. 2 through FIG. 9, explanations will be given for the processes executed in the camera 1 described above. The processes of the camera shown by the flowcharts in FIG. 2 through FIG. 9 are executed by the execution, by the microcomputer 121, of the program stored in the flash memory 125. First, explanations will be given for the flow of the entire process of the camera shown in FIG. 2 (FIG. 2A and FIG. 2B).

When a power button in the manipulation unit 123 is manipulated so as to turn on the camera 1 and the process of the camera 1 shown in FIG. 2 has been started, the microcomputer 121 initializes the camera 1 (step S1). In this process, the mechanical initialization and the electrical initialization such as the initialization or the like of various types of flags are conducted. Flags to be initialized include a during-recording flag, which represents whether or not a video is being recorded, and are set to off by the initialization. Also, the simplified process setting is also set to off.

When the initialization has been completed, the microcomputer 121 next determines whether or not the play button has been pressed (step S3). In this process, the manipulation state of the play button in the manipulation unit 123 is detected and the determination is made. Also, when the play button is being displayed on the display panel 135, a signal from the touch input unit 124 is detected and the determination is made. When the play button is pressed, the microcomputer 121 sets the operation mode to the playing mode and executes the playing process (step S700). When the playing process has been completed, the process in step S3 is executed again. Note that the playing process will be described later in detail by referring to FIG. 9.

When it has been determined in step S3 that the play button has not been pressed, the microcomputer 121 determines whether or not the menu button has been pressed, i.e., whether or not the camera has entered a state in which the menu window is displayed and the camera setting can be conducted (step S5). In this process, the manipulation state of the menu button in the manipulation unit 123 is detected and the determination is made. When the menu button is being displayed on the display panel 135, a signal from the touch input unit 124 is detected and the determination is made.

When the menu button is pressed, the microcomputer 121 detects a further manipulation on the manipulation unit 123 and changes the camera setting in accordance with the detection result (step S7). When the camera setting process has been completed, the process in step S3 is executed again.

The camera settings include, among others for example, the shooting mode setting, the recording mode setting, the setting of the finishing of images, the setting of the style of combined images, the setting of selecting images obtained in advance to be included in a combined image, the setting of whether or not to record frame images. The shooting modes include the normal shooting mode and the combined image mode.

Also, the recording modes include, among others for example, the JPEG recording, the JPEG+RAW recording, RAW recording, etc. as still image recording modes, and also include Motion-JPEG and H.264 etc. as video image recording modes. Further, the settings of the finish of images include the setting of special effects such as natural-look (Natural), vivid image (Vivid), flat image (Flat), art filter, etc.

When it has been determined in step S5 that the menu button has not been pressed, the microcomputer 121 determines whether or not the video button has been pressed (step S9). In this process, the manipulation state of the video button in the manipulation unit 123 is detected and the determination is made. When the video button is being displayed on the display panel 135, a signal from the touch input unit 124 is detected and the determination is made.

When it has been determined that the video button has not been pressed, the microcomputer 121 executes the process in step S19. When the video button is pressed, the microcomputer 121 inverts the during-recording flag (step S11). In other words, when the during-recording flag is on, it is turned off, and when it is off, it is turned on. Further, the microcomputer 121 determines whether or not an image is being recorded on the basis of the state of the inverted during-recording flag.

When the during-recording flag has been determined to be on, the microcomputer 121 determines that it has been instructed to start recording a video image, and generates a video image file (step S15) so as to prepare for recording image data. This process is executed when for example the video button is pressed for the first time after the power was turned on. Note that after generating a video image file, the process in step S19 is executed.

When the during-recording flag has been determined in step S13 to be off, the microcomputer 121 determines that it has been instructed to terminate the recording of a video image, and closes the video image file (step S17). In other words, a process of recording the number of frames in the header of the video image file and other processes are executed so that the video image file enters a state in which it can be played and the writing process is terminated. Note that after terminating the writing to the video image file, the process in step S19 is executed.

In step S19, the microcomputer 121 determines whether or not the shooting mode is the combined image mode and a prescribed combined image manipulation has been conducted on the manipulation unit 123. In this process, the setting of the shooting mode stored in the manipulation unit 123 and the manipulation state of the manipulation unit 123 are detected and the determination is made.

When it has been determined that the mode is the combined image mode and that the prescribed manipulation has been conducted, the microcomputer 121 executes a combined image manipulation process (step S600). When the combined image manipulation process has been completed, the process in step S21 is executed. The combined image manipulation process will be described later in detailed by referring to FIG. 8.

When it has been determined in step S19 that the shooting mode is not the combined image mode or that the prescribed combined image manipulation has not been conducted on the manipulation unit 123, the microcomputer 121 determines whether or not the release button has been pressed halfway (step S21).

In this process, the transition from the off state to the on state of the first release switch that coordinates with the release button is detected and the determination is made. When the release button is being displayed on the display panel 135 or the display panel 135 is functioning as the release button, a signal indicating that the display area displaying the release button or the display area displaying the live view image has been touched is detected and the determination is made.

When the release button is pressed halfway, the microcomputer 121 conducts the AE/AF operations (step S23). In this process, the AE operation is conducted by the AE process unit 111 detecting the subject luminance on the basis of image data obtained by the image pickup element 103 and calculating the shutter speed, the aperture value, etc. that lead to the correct exposure on the basis of the subject luminance.

The AF operation is conducted by the driver 205 shifting the point of focus of the image pickup lens 201 via the microcomputer 207 in the interchangeable lens 200 in such a manner that the focus evaluation value obtained by the AF process unit 113 becomes the peak value.

When the AF operation is conducted on the basis of a signal from the touch input unit 124, the image pickup lens 201 is moved so that the subject that is being displayed at the touched position is focused. After the AE/AF operations, the process in step S25 is executed.

The AF operation may employ various types of AF methods such as, among others, the phase difference AF using a dedicated sensor, in addition to the so-called contrast AF described above.

When it has been determined in step S21 that the release button has not been pressed halfway, the microcomputer 121 determines whether or not the release button has been pressed fully (step S27). In this process, the transition from the off state to the on state of the second release switch is detected and the determination is made. It is also possible to conduct continuous shooting by continuously detecting that the second release switch is in the on state and making the determination.

Also, when the release button is being displayed on the display panel 135 or the display panel 135 is functioning as the release button, a signal indicating that the display area displaying the release button or the display area displaying the live view image has been touched is detected and the determination is made.

When the release button is pressed fully, the microcomputer 121 conducts still image pickup by using a mechanical shutter (step S29). In this process, the diaphragm 203 is controlled on the basis of the aperture value calculated in step S23 and the shutter speed of the mechanical shutter 101 is controlled on the basis of the calculated shutter speed. Thereafter, when the exposure time in accordance with the shutter speed has elapsed, an image signal is read from the image pickup element 103 and RAW data processed by the analog process unit 105 and the A/D conversion unit 107 is temporarily stored in the SDRAM 127 via the bus 110.

Thereafter, the microcomputer 121 reads the RAW data temporarily stored in the SDRAM. 127 and makes the image process unit 109 execute an image process (step S100a) and executes a still image recording process, in which the process data etc. is recorded in the recording medium 131 (step S500). Also, an image process and a still image recording process will be described later in detail by referring to FIG. 3 through FIG. 6 and FIG. 7.

When a still image recording process has been completed, the microcomputer 121 determines whether or not the shooting mode is the combined image mode (step S31). In this process, the determination is made on the basis of the setting of the shooting mode stored in the SDRAM 127.

When the shooting mode is not the combined image mode, i.e., the normal shooting mode, the microcomputer 121 executes the process in step S25. When the shooting mode is the combined image mode, the microcomputer 121 changes the live view display (step S33).

In the camera 1, when the shooting mode is the combined image mode, the display panel 135 includes a plurality of display areas and the live view image is displayed in one of those display areas by the process in step S39, which will be described later. In the process of changing the live view display in step S33, the display driver 133 controls the display panel 135 so that the display area that displays the live view image is changed under control of the microcomputer 121. More specifically, the image to be displayed in the display area that was displaying the live view image is changed to an image that was picked up in step S29 and that received an image process in step S100*a*.

Further, the display area that is to display the live view image is switched so that a different display area displays the live view image. In other words, in the camera 1, the microcomputer 121 and the display driver 133 function as the display control unit that controls the display panel 135. After the live view displaying process, the microcomputer 121 executes the process in step S25.

When it has been determined in step S27 that the release button is not pressed fully, the microcomputer 121 conducts the AE operation (step S35) for a video image or the live view image. The AE operation is conducted by the AE process unit 111 calculating the shutter speed of the electronic shutter of the image pickup element 103 and the ISO sensitivity for conducting the live view display with correct exposure. After the AE operation, the microcomputer 121 conducts shooting by using the electronic shutter (step S37).

In this process, an image signal is read from the image pickup element 103 by using the electronic shutter and the RAW data processed by the analog process unit 105 and the A/D conversion unit 107 is temporarily stored in the SDRAM 127 via the bus 110.

Thereafter, the microcomputer 121 reads the RAW data temporarily stored in the SDRAM 127 and makes the image process unit 109 execute an image process similar to the one in the case of shooting that uses the mechanical shutter (step S100*b*). Further, the display driver 133 controls the display panel 135 so that the image in the display area displaying the live view image is changed under control of the microcomputer 121 to image data that was obtained in step S37 and that received an image process in step S100*b* so as to update the live view image (step S39).

When the live view image has been updated, the microcomputer 121 determines whether or not a video image is being recorded (step S41). In this process, the determination is made on the basis of the state of the during-recording flag that is stored in the SDRAM 127.

When the during-recording flag is off, the microcomputer 121 executes the process in step S25. When the during-recording flag is on, the microcomputer 121 determines that a video image is being recorded and conducts video recording (step S43). In other words, image data of the live view image updated in step S39 is recorded as a frame image of the video image file generated in step S15.

Thereafter, the microcomputer 121 executes the process in step S25.

In step S25, the microcomputer 121 determines whether or not the power is off. When the power is on, the process in step S3 is executed. When the power is off, the microcomputer 121 executes necessary termination processes and thereafter terminates the processes of the camera 1.

According to the camera 1 that operates as above, it is easy, by just touching the display area displaying the live view image, to obtain frame images that constitute a combined image and change the image being displayed in the touched display area to a frame image obtained from the live view image as shown in FIG. 10 when a subject moving over time is shot in the combine image mode. In other words, the manipulation of touching the live view image is equivalent to a shooting instruction.

Further, the display area displaying the live view image is switched automatically and a different display area that is not displaying a frame image (a different display area that is not displaying a frame image or an image obtained in advance when images obtained in advance to be included in a combined image have been set) displays the live view image, making it possible to obtain the next frame image swiftly without missing an appropriate timing for shooting even when a subject is moving. Also, because only one of a plurality of display areas defined on the display panel 135 displays the live view image, it is possible to provide users with an environment in which they can easily concentrate on shooting.

Also, it possible for the camera 1 to display, in the display area displaying the live view image, a mark representing a live view image ("LV" in this example) for discrimination between the live view image and frame images, as exemplified in for example FIG. 12. This makes it easy to identify the live view image even when it is difficult to discriminate between the live view image and frame images in a case of shooting a subject that does not change over time or in other cases.

Further, it is also possible for display areas displaying frame images to display marks indicating the order in which the frame images were obtained ("1", "2", "3" and "4" in this example). This makes it easy to know the order in which the frame images were obtained even when there are many display areas.

It is also possible for the camera 1 to display frame images with a luminance or saturation lower than the live view image as exemplified in for example FIG. 13 so that the live view image and the frame images are discriminated.

Note that while an example has been used in which the user gives an instruction to conduct shooting by using a touch manipulation in FIG. 11, the camera 1 operates similarly also by using a manipulation on the cross-shaped key and the release button.

Also, while FIG. 11 shows an example in which the four display areas disposed in a 2×2 arrangement are defined on the display panel 135, the layout of the display areas is not limited to this. Because the layout of display areas is defined by the style set for a combined image, various layouts as shown in for example FIG. 14A through FIG. 14K can be selected by changing the setting of the style of a combined image. In FIG. 14A through FIG. 14J, a plurality of display areas are arranged so that they do not overlap each other; however, FIG. 14K shows an example in which part of each display area overlaps another display area.

Figure 14A:
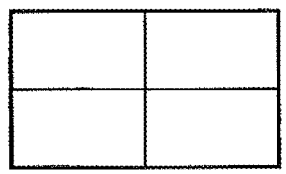
FIG. 14A is a first figure for explaining a layout of display areas.
Figure 14B:
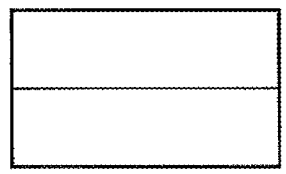
FIG. 14B is a second figure for explaining a layout of display areas.
Figure 14C:
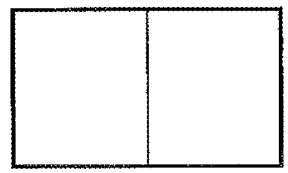
FIG. 14C is a third figure for explaining a layout of display areas.
Figure 14D:
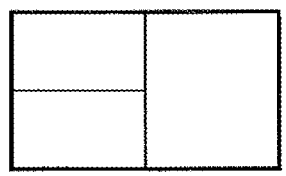
FIG. 14D is a fourth figure for explaining a layout of display areas.
Figure 14E:
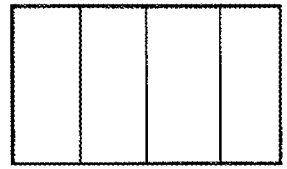
FIG. 14E is a fifth figure for explaining a layout of display areas.
Figure 14F:
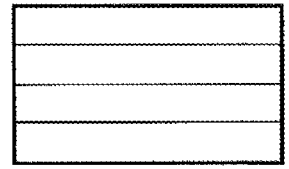
FIG. 14F is a sixth figure for explaining a layout of display areas.
Figure 14G:
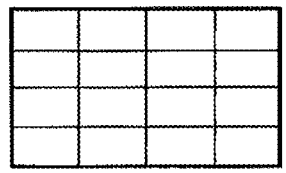
FIG. 14G is a seventh figure for explaining a layout of display areas.
Figure 14H:
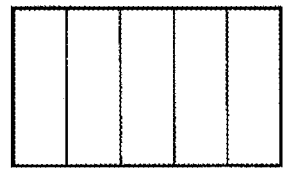
FIG. 14H is an eighth figure for explaining a layout of display areas.
Figure 14I:
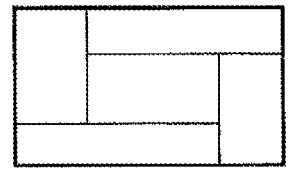
FIG. 14I is a ninth figure for explaining a layout of display areas.
Figure 14J:
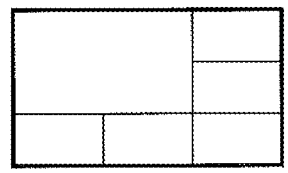
FIG. 14J is a tenth figure for explaining a layout of display areas.
Figure 14K:
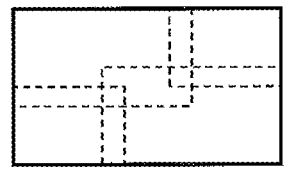
FIG. 14K is an eleventh figure for explaining a layout of display areas.
Figure 15A:
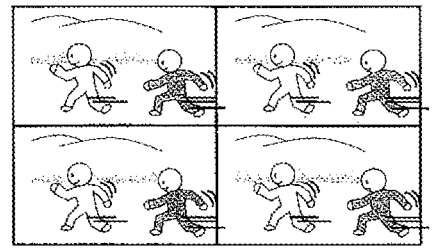
FIG. 15A is still another first figure for explaining a shooting manipulation of the camera according to example 1 of the present invention.
Figure 15B:
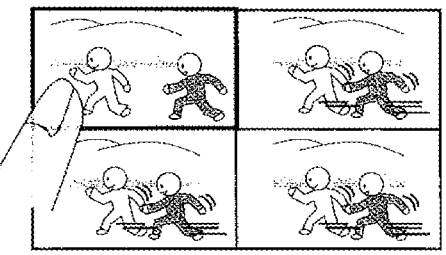
FIG. 15B is still another second figure for explaining a shooting manipulation of the camera according to example 1 of the present invention.
Figure 15C:
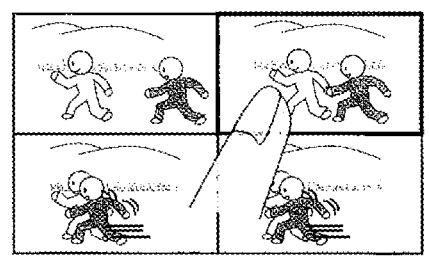
FIG. 15C is still another third figure for explaining a shooting manipulation of the camera according to example 1 of the present invention.
Figure 15D:
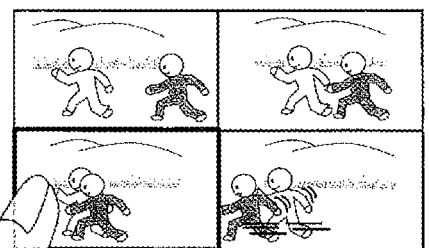
FIG. 15D is still another fourth figure for explaining a shooting manipulation of the camera according to example 1 of the present invention.
Figure 15E:
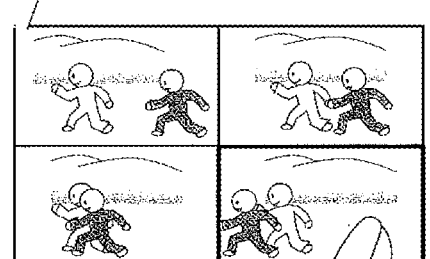
FIG. 15E is still another fifth figure for explaining a shooting manipulation of the camera according to example 1 of the present invention.

When the layout in FIG. 14K is used, the images are displayed in the respective display areas with intensities that gradually decrease with decreasing distances to the peripheries so that the boundaries between the respective images are not visible.

Note that while an example in which only one of a plurality of display areas defined on the display panel 135 displays the live view image was shown in FIG. 11, the camera 1 may also display the live view image in some or all of the plurality of display areas, except for display areas displaying frame images, as shown in FIG. 15. When all the display areas display the live view image, it is not necessary to take into consideration the period of time for switching the display area for the live view image, making it possible to obtain a plurality of frame images by continuously touching a plurality of display areas by for example sliding a finger. Accordingly, it is possible to provide users with a new manipulation feeling that has not been provided by conventional cameras.

Next, by referring to FIG. 3 through FIG. 6, explanations will be given in more detail for an image process executed after shooting by using the mechanical shutter or the electronic shutter shown in FIG. 2. Note that the target of an image process executed after shooting by using the mechanical shutter is RAW data obtained by shooting using the mechanical shutter and the target of an image process executed after shooting by using the electronic shutter is RAW data obtained by using the electronic shutter.

Figure 3:
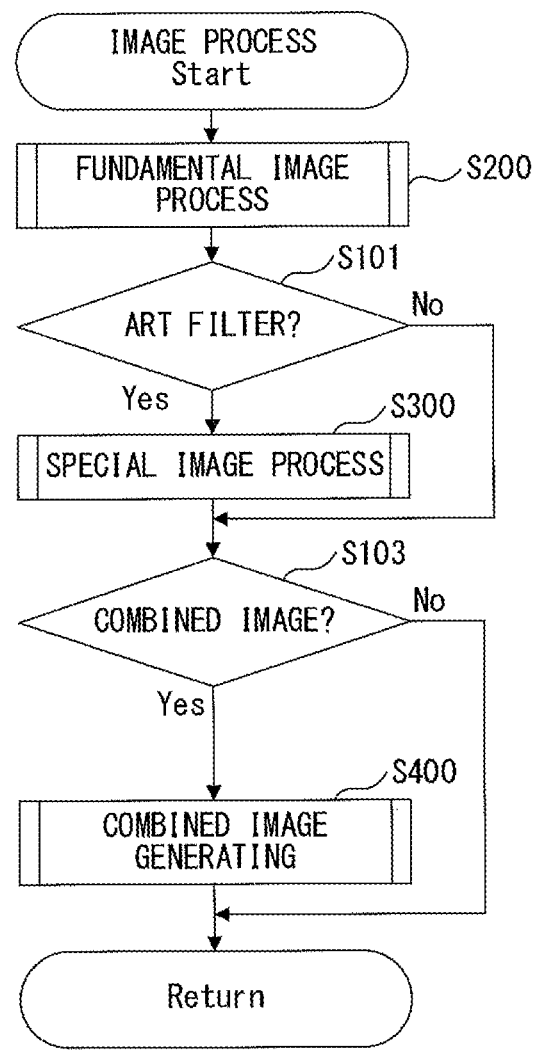
FIG. 3 is a flowchart showing an image process of the camera according to example 1 of the present invention.

As shown in FIG. 3, the image process mainly includes a fundamental image process executed by the fundamental image process unit 109a, a special image process executed by the special image process unit 109b, and a combined image generating process executed by the combined image process unit 109c.

When the microcomputer 121 reads RAW data that was temporarily stored in the SDRAM 127 to instruct the image process unit 109 to execute an image process, the fundamental image process unit 109a first executes a fundamental image process on the read RAW data (step S200).

Figure 4:
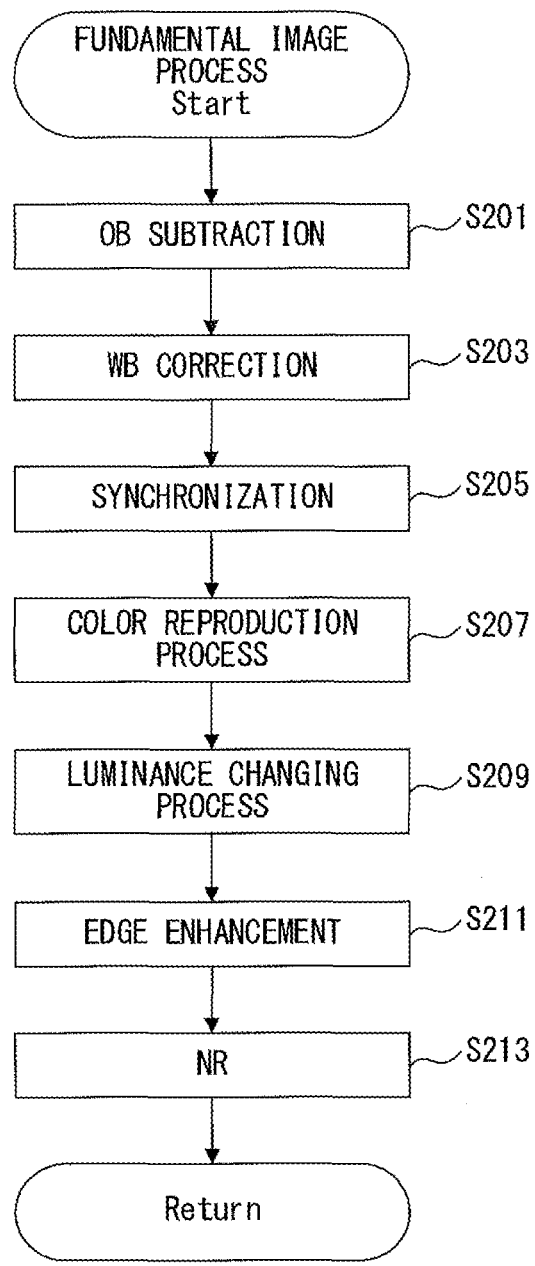
FIG. 4 is a flowchart showing a fundamental image process of the camera according to example 1 of the present invention.

The fundamental image process executed by the fundamental image process unit 109a includes seven image process steps as shown in FIG. 4. First, optical black (OB) subtraction is conducted (step S201). In this step, the OB calculation unit in the fundamental image process unit 109a extracts optical black values caused by a dark current etc. of the image pickup element 103 respectively from the pixel values of the respective pixels constituting the image data.

After the OB subtraction, the white balance (WB) is corrected (step S203). In this step, the WB correction unit in the fundamental image process unit 109a conducts the WB correction on image data in accordance with the white balance mode that has been set. Specifically, the R gain and the B gain in accordance with the white balance set by a user is read from the flash memory 125 of the camera body, the image data is multiplied by the value, and thereby the correction is conducted. In the case of auto white balance, the R gain and the B gain are calculated from the RAW data and the correction is conducted by using these.

Next, a synchronization process is executed (step S205). In this step, the synchronization process unit in the fundamental image process unit 109a converts, into RGB data, the data of each pixel (Bayer data) of the image data that has received the white balance correction. Specifically, data not included in a corresponding pixel is obtained from the periphery by the interpolation and the data is converted into RGB data. Note that this step is omitted in a case when one pixel has a plurality of pieces of data in RAW data such as in a case when an image pickup element in the form of FOVEON (a registered trademark of Foveon, Inc.) is used as the image pickup element 103 or other cases.

After the synchronization process, a color reproduction process is executed (step S207). In this step, the color reproduction unit in the fundamental image process unit 109a conducts linear conversion in which the image data is multiplied by a color matrix coefficient based on the set white balance mode so as to correct the colors in the image data. Because a color matrix coefficient is stored in the flash memory 125, it is read to be used.

After the color reproduction process, a luminance changing process is executed (step S209). In this step, the luminance changing process unit in the fundamental image process unit 109a executes a gamma correction process on the image data (RGB data). Further, color conversion from the RGB into YCbCr data is conducted so as to conduct gamma correction on Y data of the converted image data. In the gamma correction, a gamma table stored in the flash memory 125 is read to be used.

After the luminance changing process, edge enhancement is conducted (step S211). In this step, the edge enhancement process unit in the fundamental image process unit 109a extracts an edge component from the image data by a bandpass filter, multiplies a coefficient by the component in accordance with the edge enhancement level, adds the result to the image data, and thereby enhances the edge of the image data.

As the last step, NR (noise reduction) is conducted (step S213). In this step, the NR unit in the fundamental image process unit 109a performs frequency resolving on the image so as to execute a coring process in accordance with the frequency, and thereby reduces noise.

When the above fundamental image process has been completed, the special image process unit 109b executes a special image process (steps S101 and S300 in FIG. 3) on the image processed by the fundamental image process unit 109a in a case when a special effect (art filter) has been set.

Figure 5:
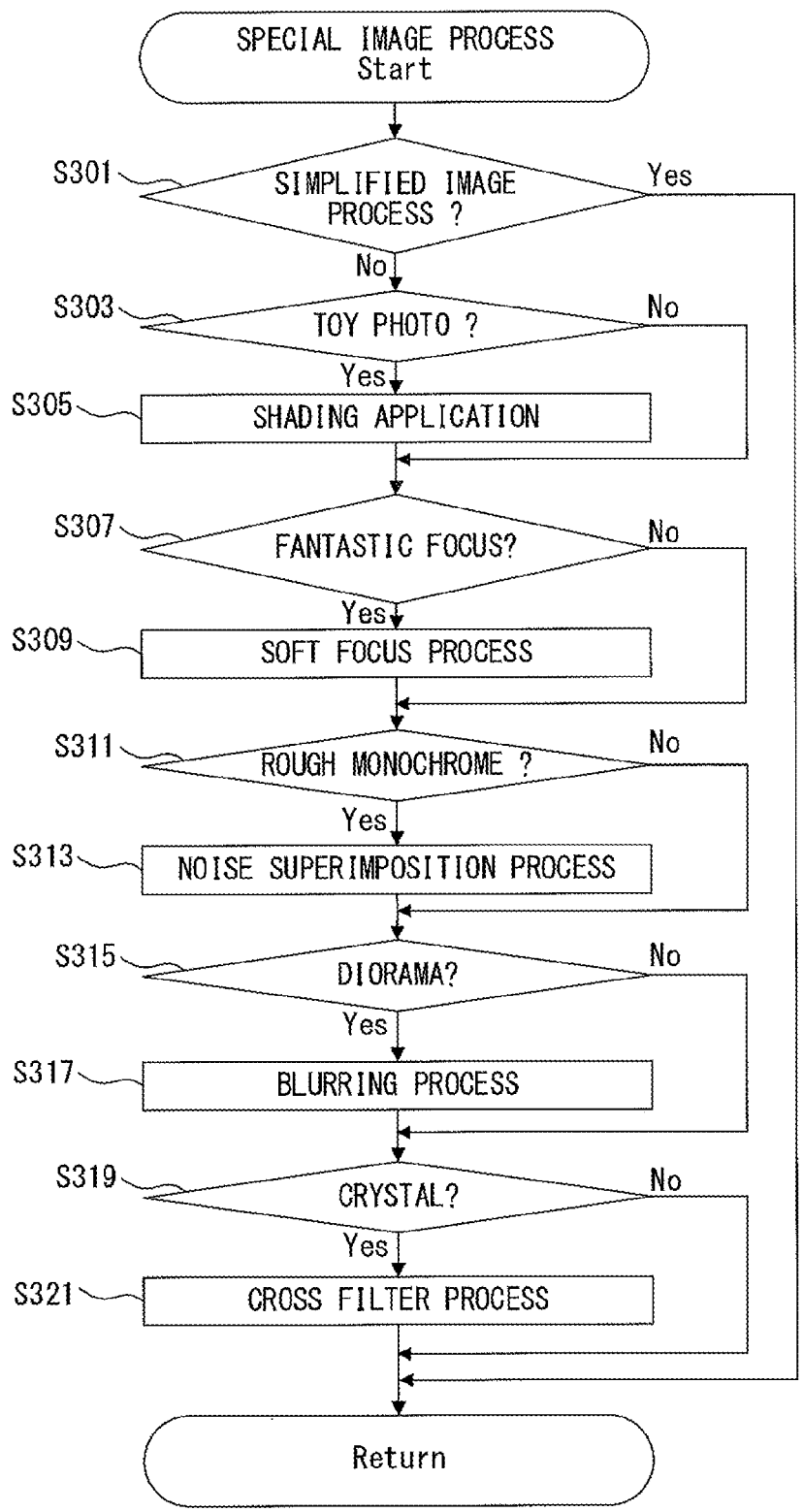
FIG. 5 is a flowchart showing a special image process of the camera according to example 1 of the present invention.

The special image process executed by the special image process unit 109b mainly includes five image process steps that are executed in accordance with the settings of a special effect, as shown in FIG. 5. First, it is determined whether or not the simplified image process has been set (step S301). In this step, the special image process unit 109b makes the determination on the basis of the state of the simplified process setting stored in the SDRAM 127. Also, when the simplified process setting is in the on state, the special image process is terminated.

When the simplified process setting is in the off state, it is sequentially determined whether or not toy photo, fantastic focus, rough monochrome, diorama or crystal has been set as a mode of a special effect (art filter) (steps S303, 307, 311, 315 and 319).

When toy photo has been set, a shading applying process is executed on the image data (step S305). In this step, the special image process unit 109b generates a gain map (the gain value is equal to or smaller than one) in which the luminance decreases gradually in accordance with the distances from the center and multiplies the gain by the image data in accordance with each pixel on the basis of that gain map, and thereby applies shading to the periphery.

When fantastic focus has been set, a soft focus process is executed on the image data (step S309). In this step, the special image process unit 109b generates image data in which a blurring process has been executed on the entire image and synthesizes the image data of the image before being blurred and the image data of the blurred image at a prescribed ratio (3:2 etc. for example).

When rough monochrome has been set, a noise superimposition process is executed on the image data (step S313). In this step, the special image process unit 109b adds a noise pattern that was generated in advance to the image data. Note that the noise pattern may be generated on the basis of random numbers etc.

When diorama has been set, a blurring process is executed on the image data (step S317). In this step, the special image process unit 109b gradually blurs, in accordance with the distance, the periphery (above/below or right/left or both) of the image having the target of the AF at the center.

When crystal has been set, across filter process is executed on the image data (step S321). In this step, the special image process unit 109b detects the luminescent spot in the image and processes the image data in such a manner that a cross pattern is drawn with that luminescent spot being the center.

When the above special image process has been completed, the combined image process unit 109c determines whether or not the shooting mode is the combined image mode (step S103 in FIG. 3). When the shooting mode is not the combined image mode, the image process is terminated.

When the shooting mode is the combined image mode, the combined image process unit 109c uses the image data of a plurality of images being displayed on a plurality of display areas on the display panel 135 so as to execute the combined image generating process (step S400 in FIG. 3).

Figure 6:
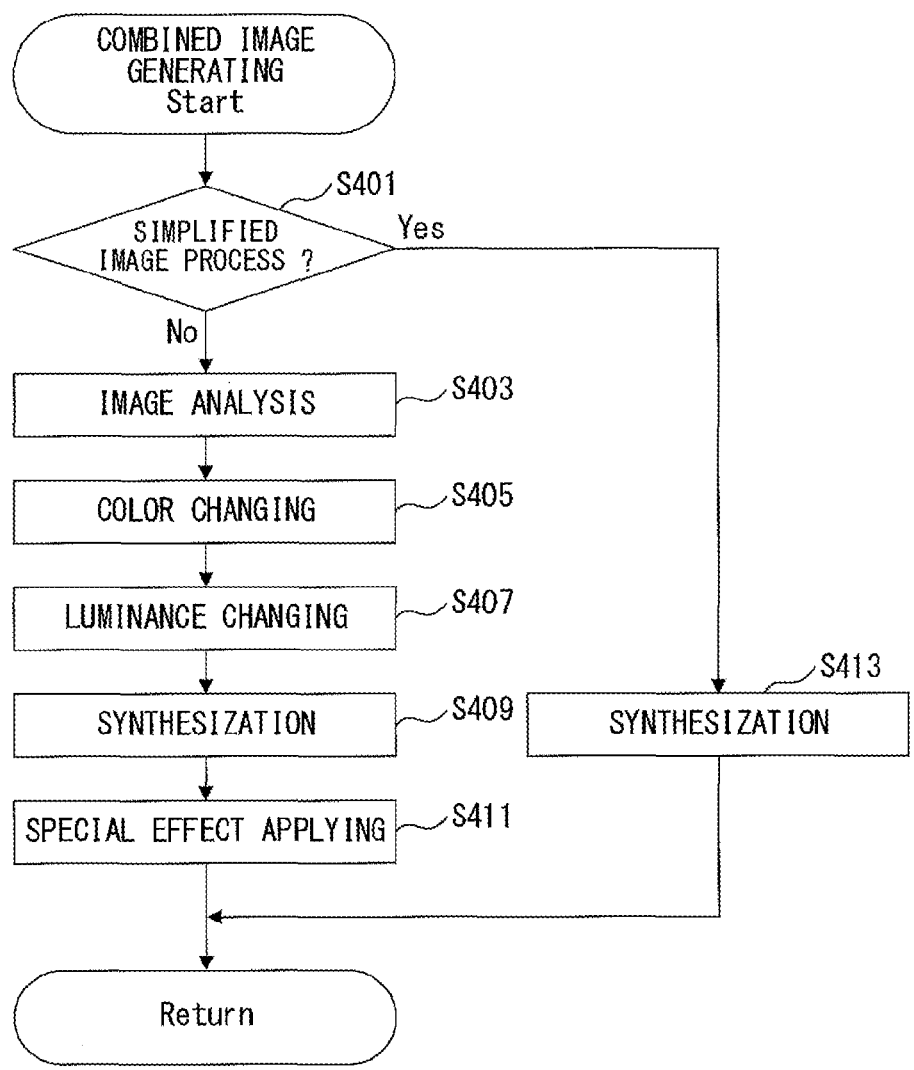
FIG. 6 is a flowchart showing a combined image generating process of the camera according to example 1 of the present invention.

The image generating process executed by the combined image process unit 109c mainly includes five image process steps as shown in FIG. 6. First, it is determined whether or not the simplified image process has been set (step S401). In this step, the combined image process unit 109c makes the determination on the basis of the state of the simplified process setting stored in the SDRAM 127.

When the simplified process setting is in the off state, image analysis is conducted (step S403). In this step, the combined image process unit 109c calculates the color distribution and the luminance distribution of each piece of the image data of a plurality of images being displayed in the display areas on the display panel 135.

Note that it is also possible to calculate the color distribution and the luminance distribution from the RAW data corresponding to the image data before the image process is executed instead of calculating them from the image data itself of the images being displayed in the display areas (i.e., the image data processed by the fundamental image process unit 109a and the special image process unit 109b).

After the image analysis, a color changing process is executed so that the images of a plurality of pieces of image data constituting the combined image have roughly the same color (step S405). In this step, the combined image process unit 109c conducts correction by offsetting color differences Cb and Cr of the respective pieces of image data in such a manner that the peak values of color differences Cb and Cr of a plurality of pieces of image data become the average value of themselves. When for example the color distribution (distribution of color differences) as shown in FIG. 16A and FIG. 16D has been calculated by the image analysis, the distribution of color differences Cb and Cr is offset as shown in FIG. 16B and FIG. 16E. As a result of this, the plurality of images that have received the color changing process come to have roughly the same color as shown in FIG. 16C and FIG. 16F.

In addition to the above method in which color differences Cb and Cr are changed, a method of changing colors in the color changing process can be realized by other methods such as, among others for example, a method in which gain is multiplied by R or B in the RGB color space.

Figure 17C:
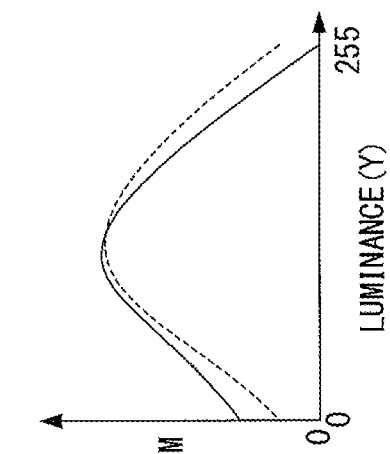
FIG. 17C is a third figure for explaining the luminance changing process executed by the combined image process unit of the camera according to example 1 of the present invention.
Figure 17B:
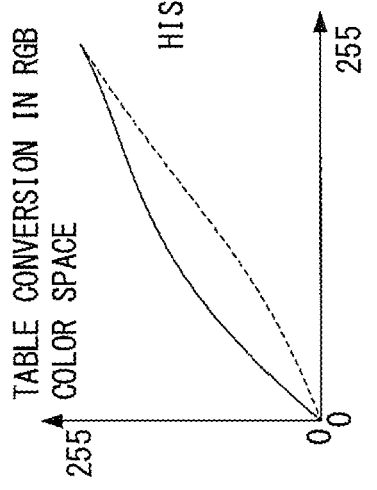
FIG. 17B is a second figure for explaining the luminance changing process executed by the combined image process unit of the camera according to example 1 of the present invention.
Figure 17A:
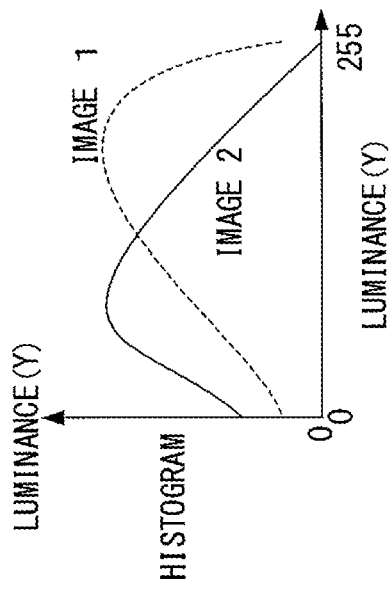
FIG. 17A is a first figure for explaining a luminance changing process executed by a combined image process unit of the camera according to example 1 of the present invention.

Further, a luminance changing process is executed so that the images of the plurality of pieces of image data constituting a combined image have roughly the same luminance (step S407). In this step, the combined image process unit 109c corrects each piece of image data so that the average of the respective values of the luminance distribution of the plurality of pieces of image data becomes the average of the luminance distribution of all the pieces of image data. In a case when for example the distribution of luminance Y has been obtained as shown in FIG. 17A by the image analysis, different gamma conversion is conducted on the RGB data of each piece of image data as shown in FIG. 17B so as to correct the distribution of luminance Y so that the plurality of images have roughly the same luminance, as shown in FIG. 17C.

The purpose of correcting luminance by conducting gamma conversion in the RGB space instead of gamma conversion on luminance components is to prevent the colors of images from becoming unnatural when the luminance has been changed greatly by correction.

In addition to the above method that uses gamma conversion, a method of changing luminance in the luminance changing process can also be realized by, among others for example, a method in which luminance only in dark areas such as shade etc. is changed or luminance is changed only in bright areas.

After the luminance changing process, a synthesization process is conducted in which a plurality of pieces of image data having the colors and the luminance corrected is synthesized (step S409). In this step, the combined image process unit 109c synthesizes the image data of a plurality of images being displayed in the plurality of display areas on the display panel 135, and more specifically, synthesizes the plurality of pieces of image data having received the color changing process and the luminance changing process and generates image data of a combined image in which those plurality of images are laid out as displayed on the display panel 135.

As the last step, the special image process unit 109b applies a special effect such as the blurring process or the shading application, which can be realized by using an art filter etc., in accordance with the style of the combined image regardless of the finishing setting in the camera setting (step S411), and terminates the combined image generating process.

When the simplified process setting is in the on state, the combined image process unit 109c synthesizes the image data of the plurality of images being displayed in the plurality of display areas on the display panel 135 and generates image data of a combined image in which those plurality of images are laid out as displayed on the display panel 135 (step S413).

Thereafter, the microcomputer 121 terminates the combined image generating process. Then, the image process shown in FIG. 3 is terminated.

According to the camera 1 that operates as described above so as to generate a combined image, each of a plurality of frame images constituting a combined image is corrected on the basis of a result of comparison with other frame images. Then, image data of the combined image is generated by synthesizing the image data of the corrected frame images. This makes it possible to obtain a better image as a combined image in which the coloration and brightness are well-balanced in comparison with conventional cameras, in which image processes are only conducted separately for frame images.

Note that while FIG. 6 has shown an example in which the color changing process and the luminance changing process are executed on each frame image, the image process executed on the basis of a result of comparison with other frame images is not limited to this and other image processes may be executed.

Next, by referring to FIG. 7, still image recording that is conducted after the image process on image data obtained through mechanical shutter shooting shown in FIG. 2 will be explained in more detail.

As shown in FIG. 7, when the still image recording process has been started, the microcomputer 121 first determines whether or not the shooting mode is the combined image mode (step S501). In this step, the determination is made on the basis of the setting of the shooting mode stored in the SDRAM 127.

When the shooting mode is not the combined image mode, the microcomputer 121 controls the display driver 133 and conducts rec-view display, on the display panel 135, of image of the image data that was obtained by using the mechanical shutter and that received the image process by the image process unit 109 (step S515).

Thereafter, the microcomputer 121 controls the memory I/F 129 so as to make the memory I/F 129 record the image data of the displayed image in the recording medium 131 (step S517) and terminates the still image recording process. The image data may also be recorded after being compressed into the JPEG format by the image compression/expansion unit 117 and may also be recorded without being compressed. Further, RAW data before receiving the image process by the image process unit 109 may also be recorded.

When the shooting mode is the combined image mode, the microcomputer 121 determines whether or not the setting is selected such that frame images (also referred to as picked-up images), which are images picked up for constituting a combined image, are recorded (step S503). When the setting of recording has been selected, the microcomputer 121 controls the memory I/F 129 so as to make the memory I/F 129 record the frame images processed by the image process unit 109 in the recording medium 131 (step S504).

Thereafter, the microcomputer 121 determines whether or not the combination has been completed, i.e., whether or not all frame images constituting the combined image have been picked up (step S505).

When images that were obtained in advance to be included in a combined image have been set, it is determined whether or not all frame images except for those images obtained in advance have been picked up. In this step, the determination is made on the basis of whether or not a plurality of frame images determined in accordance with the style set for the combined image have been stored in the frame image area of the SDRAM 127. When not all frame images have been picked up, the still image recording process is terminated.

When all frame images have been picked up, the microcomputer 121 controls the display driver 133 so as to make the display driver 133 conduct rec-view display, on the display panel 135, of the combined image generated by the image process unit 109 (step S507).

Thereafter, the microcomputer 121 monitors cancellation manipulations for a prescribed period of time (three seconds, for example) (step S509). This is to provide users with time to determine whether or not the combined image being displayed in the rec-view manner is an image that he or she desires.

When a cancellation manipulation has been detected during this prescribed period of time, the combined image manipulation process is executed in order to cancel a specified image (step S600) and the still image recording process is terminated.

When a cancellation manipulation has not been detected, the memory I/F 129 is controlled so that the memory I/F 129 makes the recording medium 131 record the image data of the combined image generated by the image process unit 109 (step S511), and the still image recording process is terminated.

It is also possible to display a window asking whether or not to record an image (whether or not to cancel it) instead of monitoring cancellation manipulations for a prescribed period of time so as to cancel or record it in accordance with the input from the user.

Figure 8A:
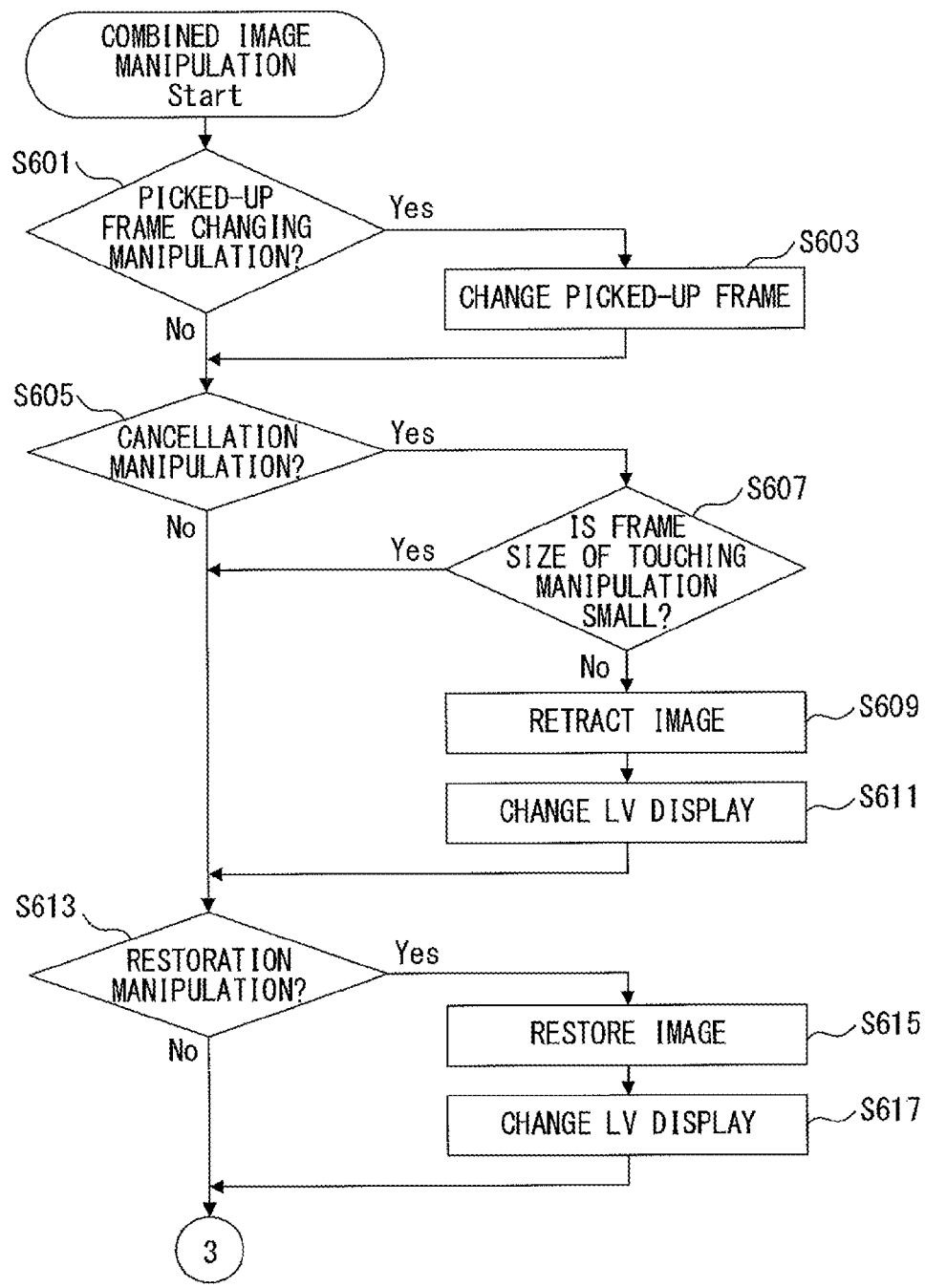
FIG. 8A is a flowchart (Part 1) showing a combined image manipulation process of the camera according to example 1 of the present invention.
Figure 8B:
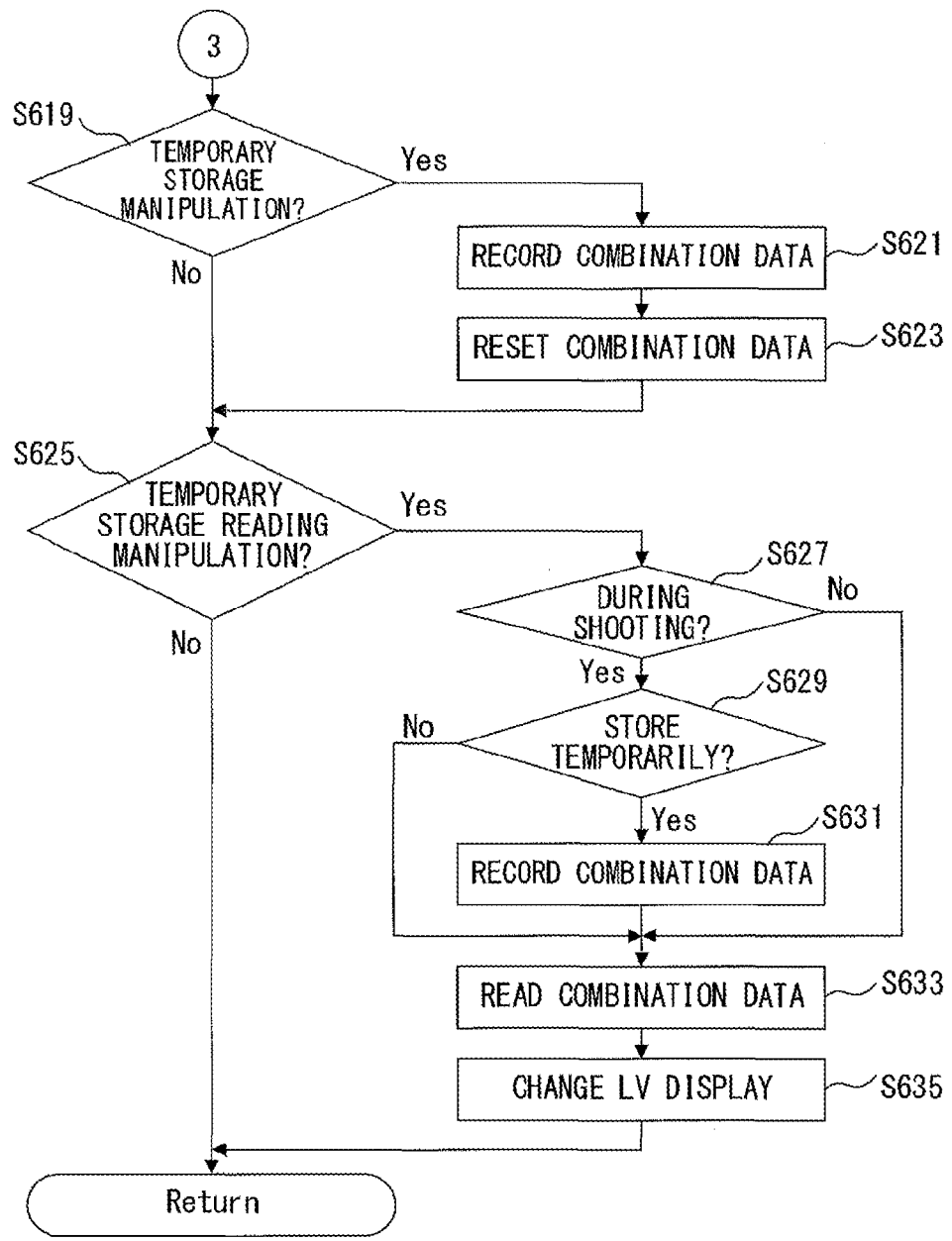
FIG. 8B is a flowchart (Part 2) showing a combined image manipulation process of the camera according to example 1 of the present invention.

Next, the combined image manipulation process will be explained in more detail by referring to FIG. 8 (FIG. 8A and FIG. 8B).

As shown in FIG. 8, when the combined image manipulation process has been started, the manipulation that started the combined image manipulation process is identified.

Specifically, the microcomputer 121 sequentially determines whether or not a picked-up frame changing manipulation, a cancellation manipulation, a restoration manipulation, a temporary storage manipulation, and a temporary storage reading manipulation were conducted (steps S601, S605, S613, S619 and S625).

The determination of whether or not a picked-up frame changing manipulation in step S601 has been conducted is made on the basis of for example whether or not the touch input unit 124 has detected a touch manipulation on a display area that is not displaying an image.

When the microcomputer 121 has detected a touch manipulation on a display area that is not displaying an image, the microcomputer 121 executes the picked-up frame changing process, i.e., a process of displaying the live view image in the touched display area by switching the display area that is to display the live view image (step S603).

The determination of whether or not a cancellation manipulation in step S605 has been conducted is made on the basis of for example whether or not the touch input unit 124 has detected a touch manipulation on the display area that is displaying an image (frame image) based on the RAW data obtained by still image pickup by using the mechanical shutter. When a touch manipulation on the display area displaying a frame image has been detected, the microcomputer 121 determines whether or not the size of the touched frame image (display area) is small (step S607).

When it has been determined that the size of a frame image is small, the process in step S613 is executed without conducting a cancellation process (step S609 and step S611), which will be described later. When the size of a frame image is small, a situation often occurs in which for example a display area that is not an intended display area is touched such as in a case when the user mistakenly touches a frame image intending to touch the live view image for giving a shooting instruction.

Against this background, this determination process is provided in order to avoid the occurrence of an unintended cancellation process.

Whether or not the size of a frame image is small may also be determined on the basis of the number of the display areas or the style of a combined image. In other words, it is also possible to set in advance in such a manner that when for example a style has been set for the layout of FIG. 14G where the number of the divisions (the number of the display areas) is large, the size of a frame image is determined to be small, and when a style has been set for other layouts, the size of a frame image is determined to be large.

Whether or not the size of a frame image is small may also be determined on the basis of whether or not the area of a touched display area is smaller than a prescribed area. In such a case, the size of the display panel 135 is taken into consideration differently from the case when the determination is made on the basis of the number of the display areas or the style of the combined image. Accordingly, this configuration is advantageous in that it is possible to avoid a cancelation process only in a case when the size of a frame image is a size that can cause an unintended cancellation process.

Figure 19:
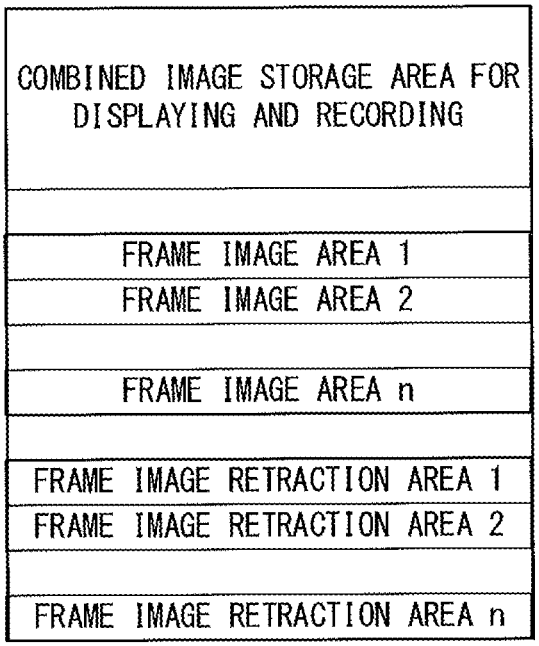
FIG. 19 is a figure for explaining a configuration of a display/storage combined image storage areas in an SDRAM of the camera according to example 1 of the present invention.

When the size of a frame image has been determined to be large, the microcomputer 121 executes an avoidance process (step S609) in which the image data of the frame image being displayed in the touched display area is retracted. Specifically, in a case when a display/storage combined image storage area including frame image areas and frame image retraction areas has been secured in the SDRAM 127 as shown in FIG. 19, the image data of the frame image ("frame image 2") being displayed in the touched display area is copied from a frame image area of the SDRAM 127 onto a frame image retraction area and the original image data stored in a frame image area is deleted.

Also, when the image data of frame images is managed by using reference pointers as shown in FIG. 21A and FIG. 21B, it is also possible to delete the reference based on a reference pointer to the address of image data instead of deleting image data itself.

Figure 22A:
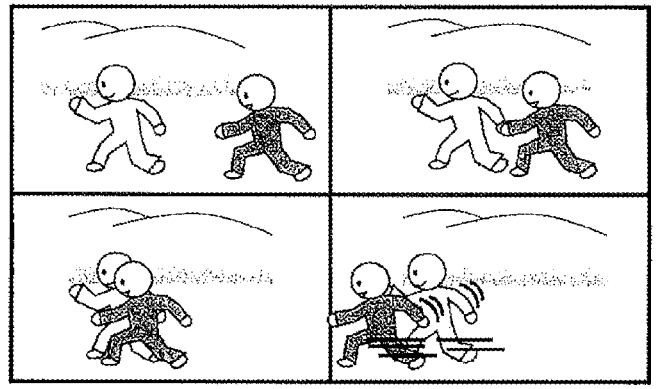
FIG. 22A is a first figure for explaining a cancellation manipulation of the camera according to example 1 of the present invention.
Figure 22B:
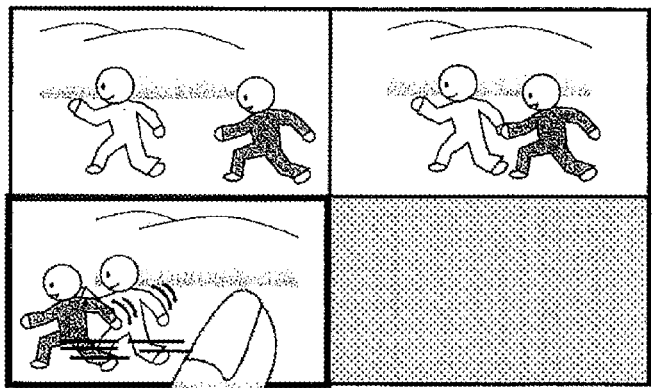
FIG. 22B is a second figure for explaining a cancellation manipulation of the camera according to example 1 of the present invention.

Thereafter, the microcomputer 121 executes a live view display changing process as exemplified in FIG. 22, i.e., a process of switching the display area for displaying the live view image so as to change the image displayed in the touched display area to the live view image (step S611).

The determination of whether or not the restoration manipulation in step S613 has been conducted is made on the basis of whether or not the manipulation unit 123 has detected a prescribed manipulation (for example a double-click manipulation on the display area displaying the live view image, a pressing manipulation of the delete button after selecting the display area displaying the live view image, etc.). When a restoration manipulation has been detected, the microcomputer 121 executes the image restoration process of restoring the image data of a frame image (step S615) cancelled by the cancellation manipulation (step S609 and step S611). Specifically, as shown in FIG. 20B and FIG. 20C, for example, a frame image ("frame image 2") retracted to the retraction area of the SDRAM 127 is copied onto the original frame image area and a process of deleting the image data in the frame image retraction area is executed. Also, when the image data of frame images is managed by using reference pointers as shown in FIG. 21B and FIG. 21C, the reference based on the reference pointers to the address of the image data may be restored.

Thereafter, the microcomputer 121 executes a live view display changing process, i.e., a process of displaying the restored frame image in the display area that was displaying the live view image and displaying the live view image in an area not displaying a frame image (step S617).

The determination of whether or not the temporary storage manipulation in step S619 has been conducted is made on the basis of whether or not the manipulation unit 123 has detected a prescribed manipulation (a pressing manipulation on the temporary storage button for example). When a temporary storage manipulation has been detected, the microcomputer 121 controls the memory I/F 129 so as to record, in the recording medium 131, the image data of frame images stored in the combined image storage area of the SDRAM 127 and different data (data related to the set style of a combined image, data representing the relationship between the image data of frame images and the display areas, etc.) for generating the image data of the combined image (step S621). Also, in the process in step S621, data may be recorded in the flash memory 125 instead of the recording medium 131.

Thereafter, the microcomputer 121 executes a combined image reset process in which image data stored in the combined image storage area of the SDRAM 127 is deleted so as to update the display state of the display panel 135 (step S623).

The determination of whether or not the temporary storage reading manipulation in step S625 has been conducted is made on the basis of whether or not the manipulation unit 123 has detected a prescribed manipulation (pressing of the temporary storage reading button for example). When a temporary storage reading manipulation has been detected, the microcomputer 121 determines whether or not shooting is being conducted (step S627). This determination is made on the basis of for example whether or not the image data of frame images is stored in the combined image storage area of the SDRAM 127.

When it has been determined that shooting is being conducted, the microcomputer 121 controls the display driver 133 so as to make the display driver 133 display information for selecting whether or not to temporarily store the image data etc. of frame images stored in the combined image storage area (step S629).

When the user has selected temporarily storing, the microcomputer 121 controls the memory I/F 129 so as to record in the recording medium 131 the image data etc. of frame images stored in the combined image storage area (step S631). It is also possible to record the information in the flash memory 125 instead of the recording medium 131.

Thereafter, the microcomputer 121 reads from the recording medium 131 image data etc. of the frame images recorded in step S621 and develops it in the combined image storage area of the SDRAM 127 (step S633). The microcomputer 121 displays, in the display area on the display panel 135, the image data of frame images stored in the combined image storage area of the SDRAM 127, and displays the live view image in a display area that is not displaying a frame image (step S635). Thereby, the combined image manipulation process shown in FIG. 8 is terminated.

Figure 18A:
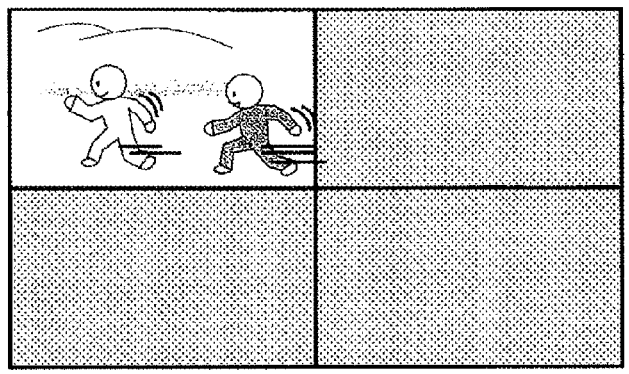
FIG. 18A is a first figure for explaining a picked-up frame changing manipulation of the camera according to example 1 of the present invention.
Figure 18B:
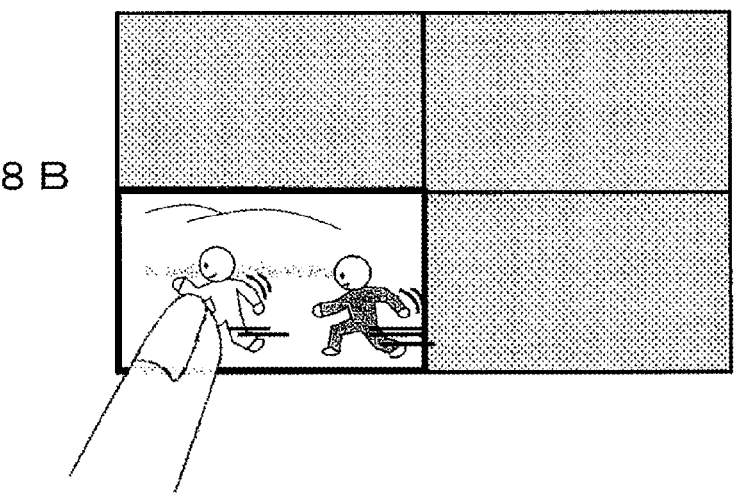
FIG. 18B is a second figure for explaining a picked-up frame changing manipulation of the camera according to example 1 of the present invention.
Figure 24:
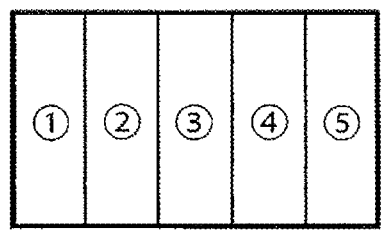
FIG. 24 is a figure for showing the relationship between the display areas and the shooting order of conventional cameras.

According to the camera 1 that operates as above, it is easy to change a display area for displaying the live view image through a touch manipulation as shown in FIG. 18 and accordingly it is possible for example to make a plurality of respective display areas display picked-up frame images in an arbitrary order, as shown in FIG. 23A through FIG. 23C. This makes it possible to generate a combined image displaying picked-up frame images in the areas intended by the user and in the order intended by the user, differently from conventional cameras in which display areas are fixed by the order of shooting as shown in FIG. 24. Accordingly, it is easy to generate image data of a desired combined image.

While FIG. 18 shows an example in which a display area for displaying the live view image is changed through a touch manipulation on the display panel 135, the camera 1 may change a display area for displaying the live view image through a key manipulation on the cross-shaped key, etc. Also, when as shown in FIG. 15 the live view image has been set for all display areas except for a display area for displaying a frame image, it is also possible to employ a configuration in which a picked-up frame (i.e., the display area that displays a frame image obtained in the next shooting) can be changed by a cross-shaped key. Thereby, even in a case when shooting is instructed through the release button, it is possible to generate a combined image displaying picked-up frame images in the areas intended by the user and in the order intended by the user similarly to a case in which shooting is instructed through a touch manipulation.

Also, as shown in FIG. 22, in the camera 1, a frame image is changed to the live view image only by touching the display area displaying the frame image. This makes it easy to perform a retake in a case of an undesired frame image through a simple manipulation and it is easy to generate image data of a desired combined image.

While FIG. 22 shows an example in which the live view image is displayed in the display area that was touched to cancel a frame image, the camera 1 may display a background image in the touched display area.

In such a case, it is possible to cancel the frame image without changing the display area displaying the live view image.

Figure 25A:
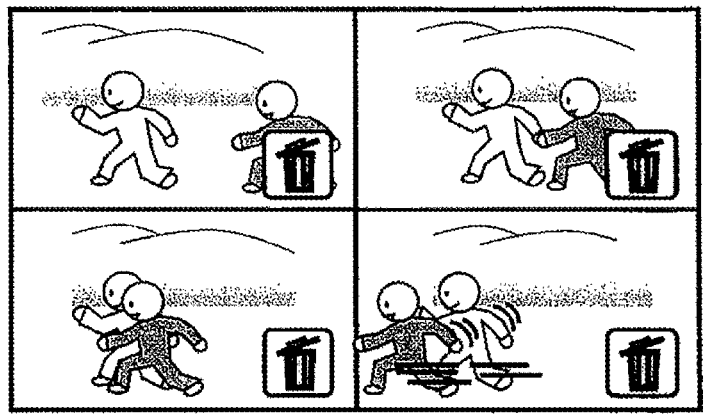
FIG. 25A is another first figure for explaining a cancellation manipulation of the camera according to example 1 of the present invention.
Figure 25B:
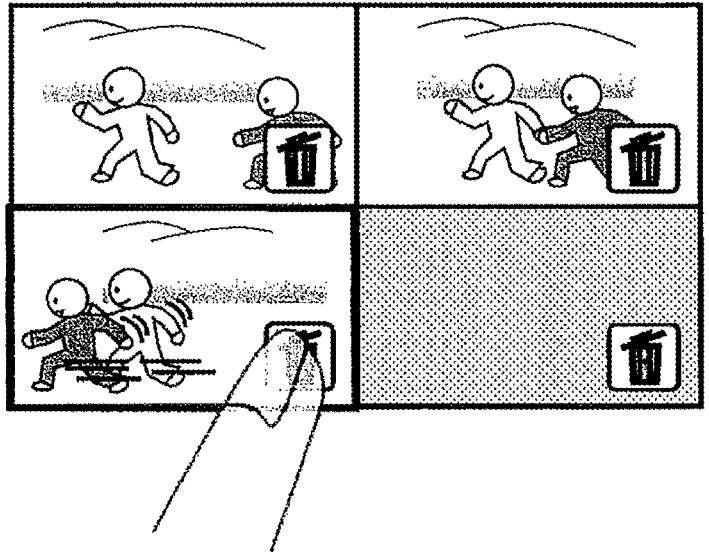
FIG. 25B is another second figure for explaining a cancellation manipulation of the camera according to example 1 of the present invention.

A method of canceling a frame image is not limited to the method shown in FIG. 22. As shown in for example FIG. 25, a frame image may be cancelled through a touch manipulation on the trash bin mark displayed in each display area. Also, as shown in FIG. 26, it is possible to display only one trash bin mark in a corner of the display panel 135, and in such a case it is also possible to cancel a frame image when the frame image to be cancelled is dragged to the trash bin mark. Also, it is possible to cancel a frame image selected by using the cross-shaped key through a manipulation on the cross-shaped key and the trash bin button as shown in FIG. 27 instead of a manipulation on the display panel 135.

Figure 9A:
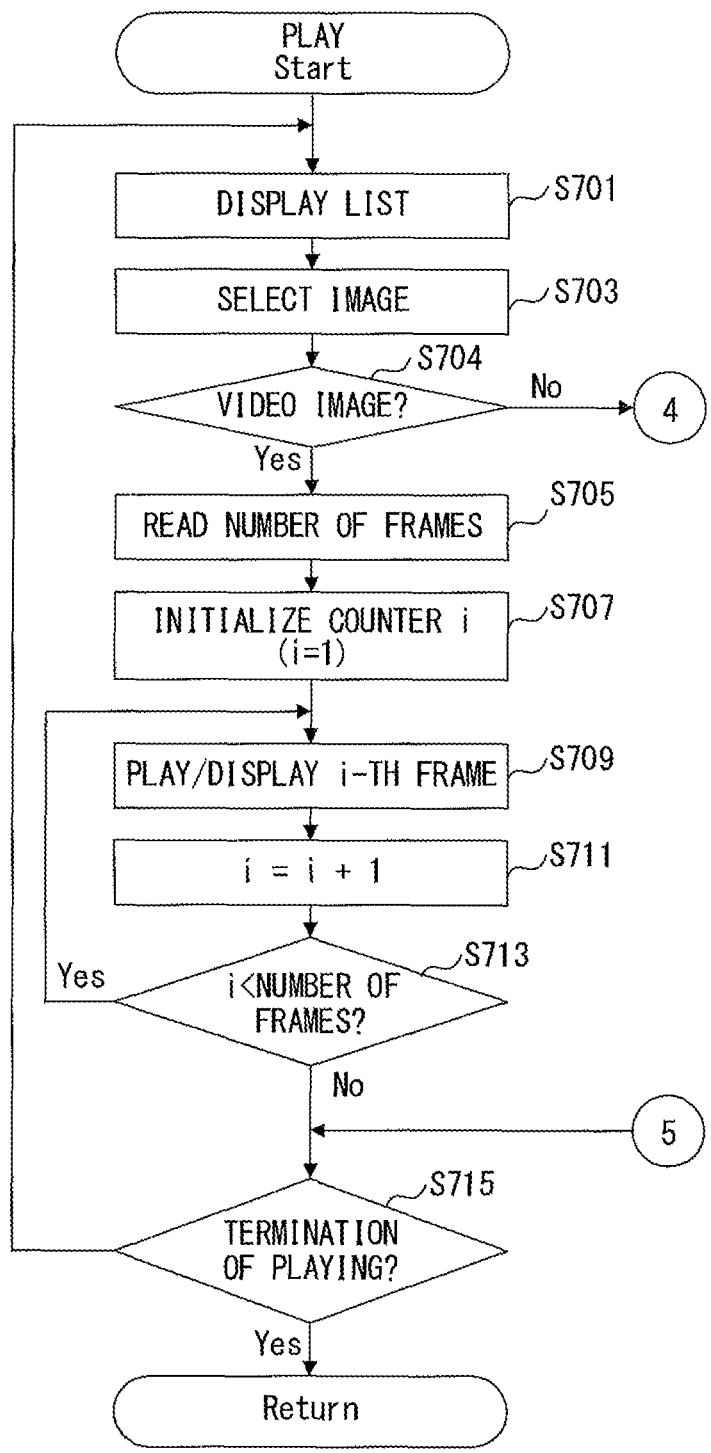
FIG. 9A is a flowchart (Part 1) showing a playing process of the camera according to example 1 of the present invention.
Figure 9B:
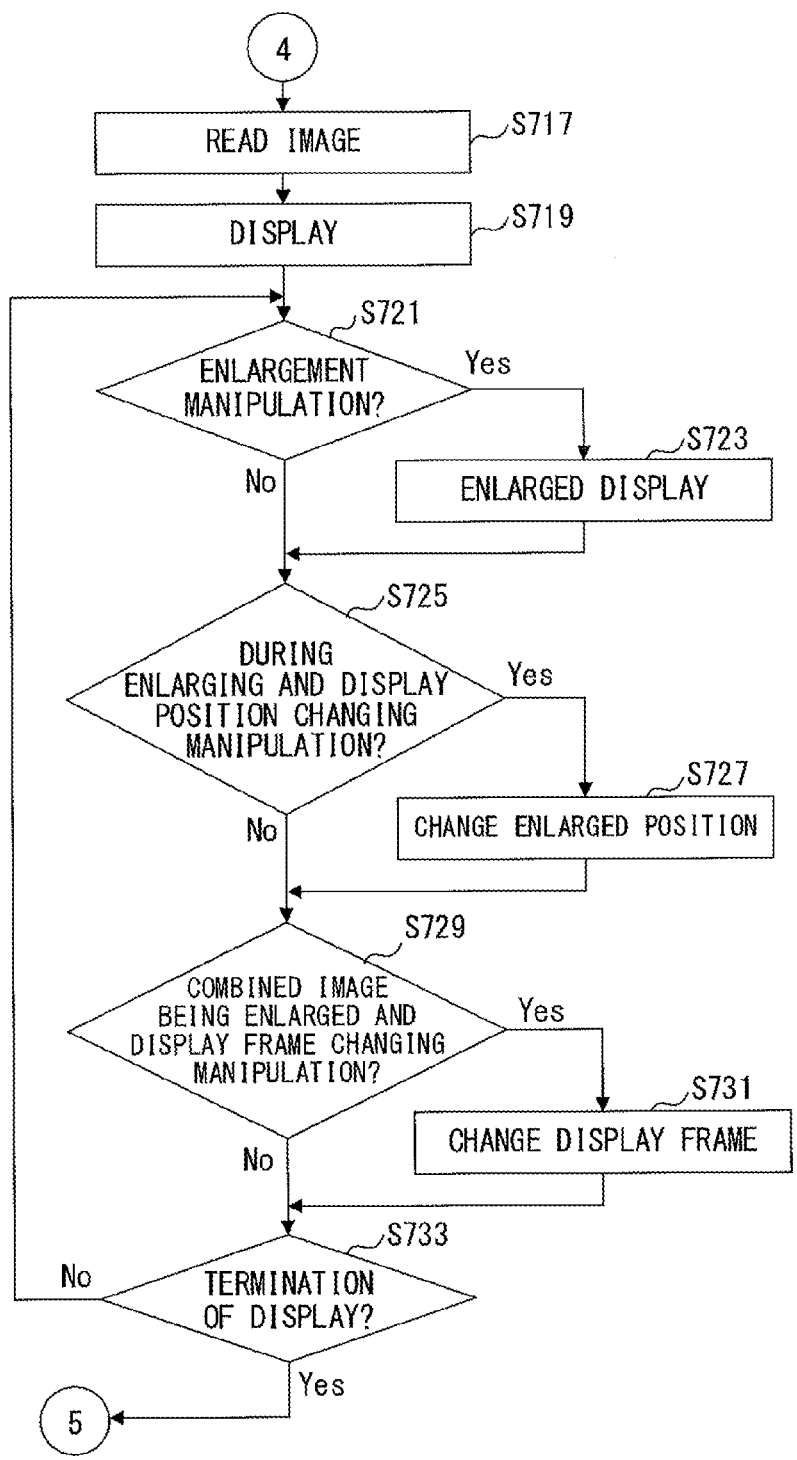
FIG. 9B is a flowchart (Part 2) showing a playing process of the camera according to example 1 of the present invention.
Figure 10A:
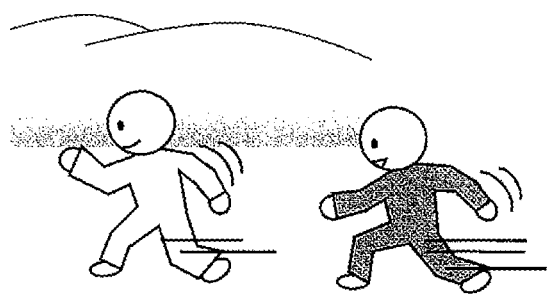
FIG. 10A is a first figure for explaining movement of a subject.
Figure 10B:
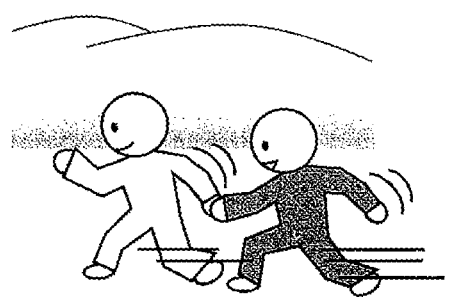
FIG. 10B is a second figure for explaining movement of the subject.
Figure 10C:
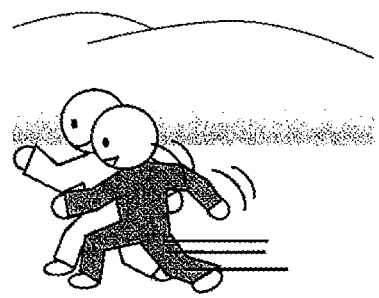
FIG. 10C is a third figure for explaining movement of the subject.
Figure 10D:
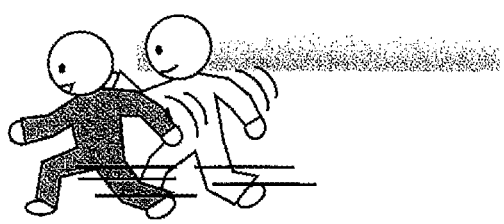
FIG. 10D is a fourth figure for explaining movement of the subject.
Figure 11A:
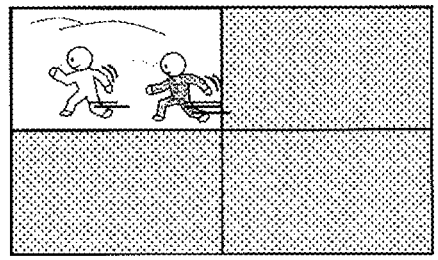
FIG. 11A is a first figure for explaining a shooting manipulation of the camera according to example 1 of the present invention.
Figure 11B:
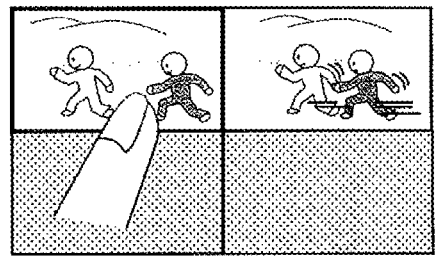
FIG. 11B is a second figure for explaining a shooting manipulation of the camera according to example 1 of the present invention.
Figure 11C:
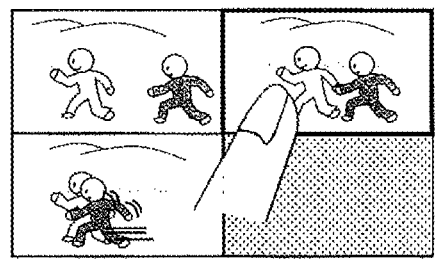
FIG. 11C is a third figure for explaining a shooting manipulation of the camera according to example 1 of the present invention.
Figure 11D:
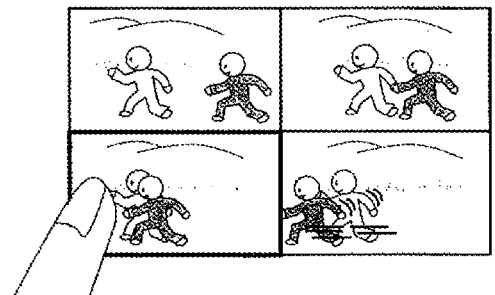
FIG. 11D is a fourth figure for explaining a shooting manipulation of the camera according to example 1 of the present invention.
Figure 11E:
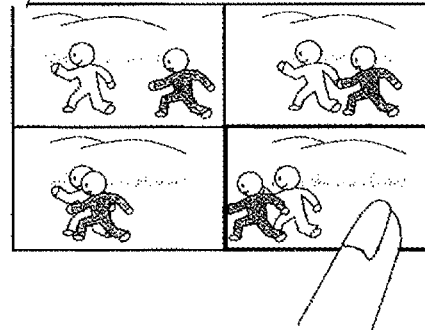
FIG. 11E is a fifth figure for explaining a shooting manipulation of the camera according to example 1 of the present invention.
Figure 12A:
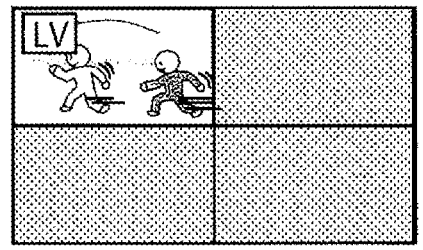
FIG. 12A is another first figure for explaining a shooting manipulation of the camera according to example 1 of the present invention.
Figure 12B:
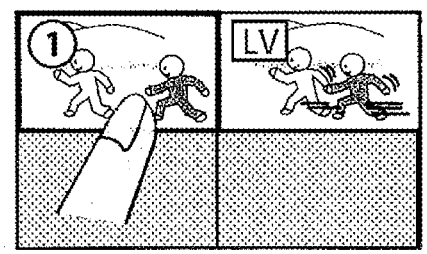
FIG. 12B is another second figure for explaining a shooting manipulation of the camera according to example 1 of the present invention.
Figure 12C:
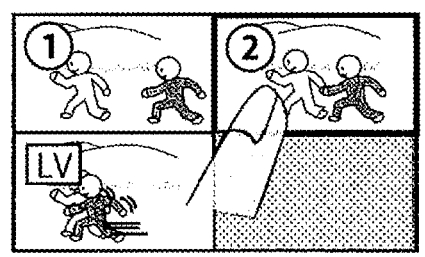
FIG. 12C is another third figure for explaining a shooting manipulation of the camera according to example 1 of the present invention.
Figure 12D:
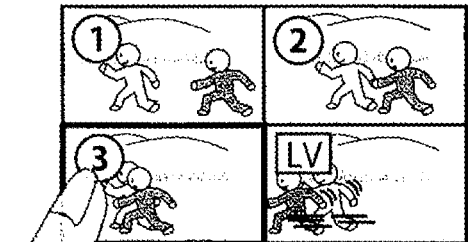
FIG. 12D is another fourth figure for explaining a shooting manipulation of the camera according to example 1 of the present invention.
Figure 12E:
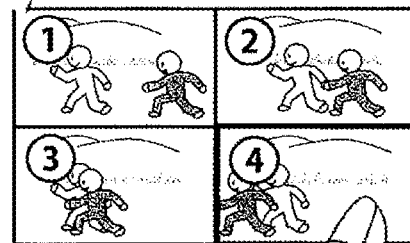
FIG. 12E is another fifth figure for explaining a shooting manipulation of the camera according to example 1 of the present invention.
Figure 13A:
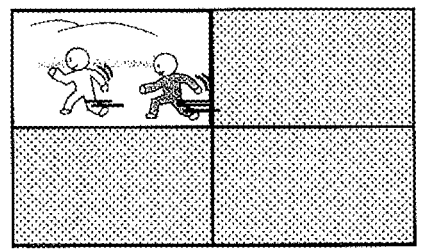
FIG. 13A is still another first figure for explaining a shooting manipulation of the camera according to example 1 of the present invention.
Figure 13B:
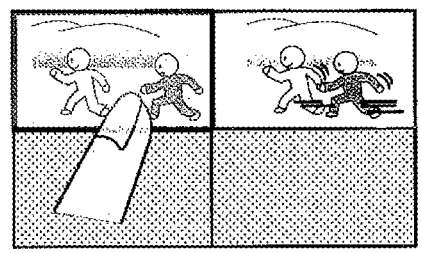
FIG. 13B is still another second figure for explaining a shooting manipulation of the camera according to example 1 of the present invention.
Figure 13C:
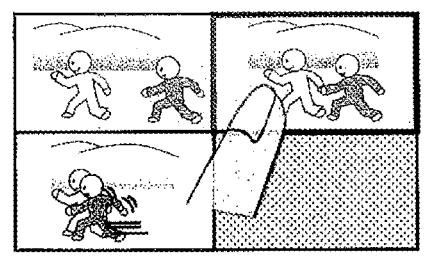
FIG. 13C is still another third figure for explaining a shooting manipulation of the camera according to example 1 of the present invention.
Figure 13D:
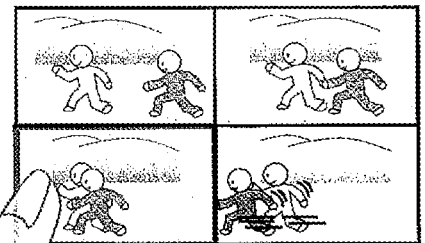
FIG. 13D is still another fourth figure for explaining a shooting manipulation of the camera according to example 1 of the present invention.
Figure 13E:
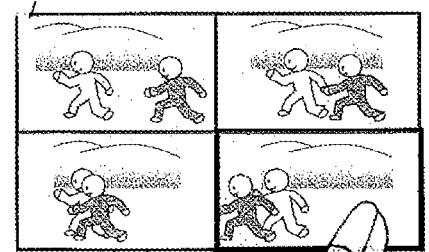
FIG. 13E is still another fifth figure for explaining a shooting manipulation of the camera according to example 1 of the present invention.

Next, by referring to FIG. 9 (FIG. 9A and FIG. 9B), the playing process shown in FIG. 2 will be explained in more detail.

As shown in FIG. 9, when the playing process has been started, the microcomputer 121 reads image data from the recording medium 131 by controlling the memory I/F 129, controls the display driver 133 to make the display driver 133 display, in a listed manner and on the display panel 135, the thumbnails of images (still and video images) stored in the recording medium 131 (step S701), and monitors image selection manipulations conducted by the user (step S703).

When the image selection has been detected, whether or not the selected image is a video image is determined (step S704).

When the image is a video image, the microcomputer 121 reads the number of frames from the header of the video image file (step S705), and sequentially plays the frame images of the video image file so as to display them on the display panel 135 (step S709, step S711 and step S713) after an initialization process of counter i (step S707).

When the image is a still image, the microcomputer 121 reads the image data of the selected image (step S717) and displays the selected image on the display panel 135 (step S719).

Thereafter, the microcomputer 121 monitors various types of manipulations conducted by the user while playing images (step S721, step S725, step S729 and step S733).

When an enlargement button has been pressed so that an enlarging manipulation has been detected (step S721), the microcomputer 121 conducts an enlarged display process in which the image being displayed on the display panel 135 is displayed in an enlarged state (step S723).

Figure 28A:
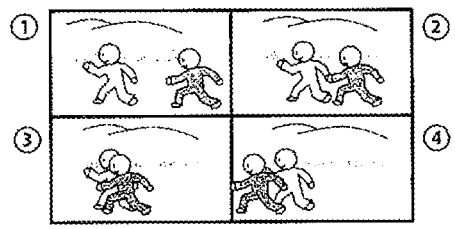
FIG. 28A is a first figure for explaining an enlarged display manipulation in the playing mode of the camera according to example 1 of the present invention.
Figure 28B:
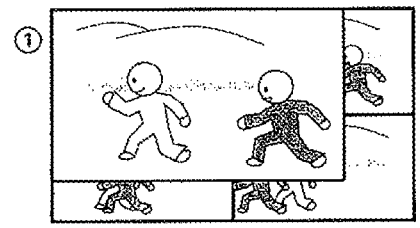
FIG. 28B is a second figure for explaining an enlarged display manipulation in the playing mode of the camera according to example 1 of the present invention.
Figure 28E:
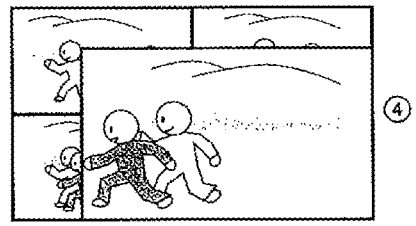
FIG. 28E is a fifth figure for explaining an enlarged display manipulation in the playing mode of the camera according to example 1 of the present invention.
Figure 28C:
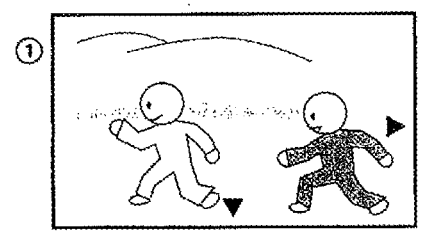
FIG. 28C is a third figure for explaining an enlarged display manipulation in the playing mode of the camera according to example 1 of the present invention.
Figure 28F:
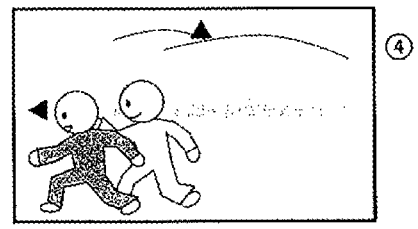
FIG. 28F is a sixth figure for explaining an enlarged display manipulation in the playing mode of the camera according to example 1 of the present invention.
Figure 28D:
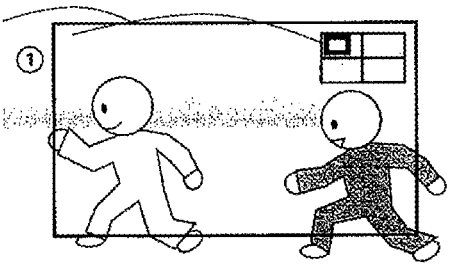
FIG. 28D is a fourth figure for explaining an enlarged display manipulation in the playing mode of the camera according to example 1 of the present invention.
Figure 28G:
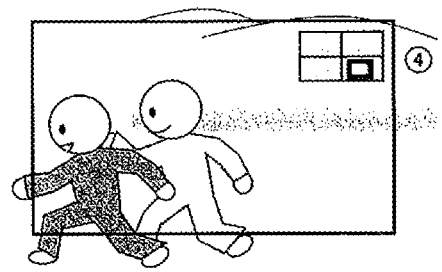
FIG. 28G is a seventh figure for explaining an enlarged display manipulation in the playing mode of the camera according to example 1 of the present invention.
Figure 29A:
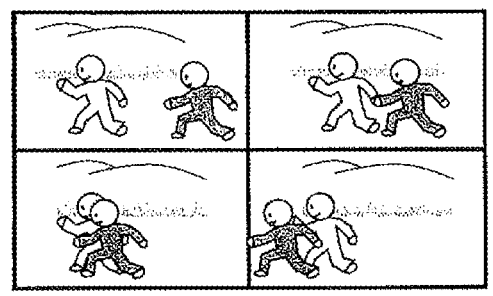
FIG. 29A is another first figure for explaining an enlarged display manipulation in the playing mode of the camera according to example 1 of the present invention.
Figure 29B:
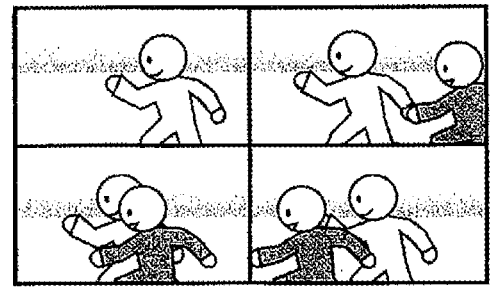
FIG. 29B is another second figure for explaining an enlarged display manipulation in the playing mode of the camera according to example 1 of the present invention.

When the image being displayed is a combined image as shown in FIG. 28A, the display area displaying a particular frame image that is a constituent of the combined image is enlarged so as to display that particular frame image in an enlarged state, as shown in FIG. 28B or FIG. 28E. It is also possible to display a particular frame image in an enlarged state entirely on the display panel 135, as shown in FIG. 28C and FIG. 28F, and in such a case it is also possible to indicate the existence of other frame images that are constituents of the combined image by displaying an arrow mark in the enlarged frame image or by other means. It is also possible to enlarge a frame image beyond the size of the display panel 135, as shown in FIG. 28D and FIG. 28G, and in such a case it is also possible to display the scope in which the frame image being displayed on the display panel 135 occupies the combined image together with the frame image. It is also possible to display all frame images constituting the combined image in an enlarged state, as shown in FIG. 29A or FIG. 29B, instead of displaying a particular frame image in an enlarged state.

When a manipulation of changing a display position by using the cross-shaped key etc. has been detected during display enlargement (step S725), the microcomputer 121 executes an enlarged position changing process (step S727). When for example a normal image that is not a combined image is being displayed, the portion being displayed in an enlarged state in the image is changed. Also, when a particular frame image that is a constituent of the combined image as shown in FIG. 28D and FIG. 28G and that is being displayed has been enlarged beyond the size of the display panel 135, the portion being displayed in an enlarged state in that particular frame image is changed.

When a manipulation of changing a frame image to be displayed by using a prescribed button such as a Fn button has been detected during display enlargement of a combined image (step S729), the microcomputer 121 executes a display frame changing process of changing a frame image that is displayed in an enlarged state (step S731).

Before changing a frame image, the enlarged display state of the frame image that is being displayed currently is stored. Thereby, it is possible to display a frame image in an enlarged state in the same enlarged display state, i.e., with the same portion being displayed in an enlarged state in the frame image when the combined image that is being displayed currently is displayed again.

Thereafter, the microcomputer 121 repeats the monitoring of the above various types of manipulations until an instruction to terminate the display of still images is given (step S733).

When an instruction to terminate the display of still images has been given, it is determined whether or not to terminate the playing process (step S715). In this process, the determination is made by detecting a change of for example the operation mode of the camera 1 from the playing mode to the shooting mode. When a change in the operation mode has not been detected, step S701 is again executed so as to display the thumbnails in a listed manner. When a change in the operation mode to the shooting mode has been detected, the playing process is terminated.

Figure 30A:
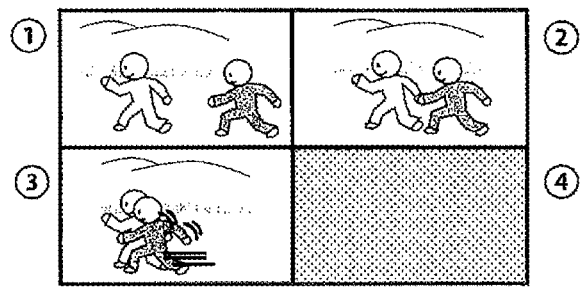
FIG. 30A is a first figure for explaining an enlarged display manipulation in the combined image mode of the camera according to example 1 of the present invention.
Figure 30B:
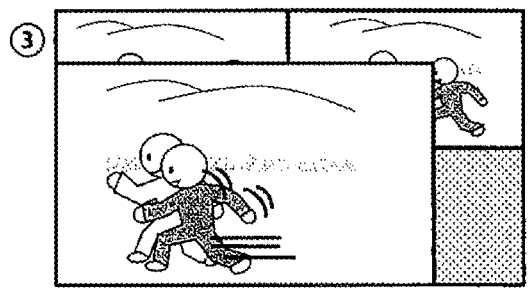
FIG. 30B is a second figure for explaining an enlarged display manipulation in the combined image mode of the camera according to example 1 of the present invention.
Figure 30C:
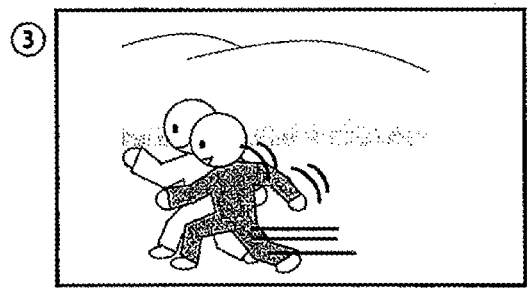
FIG. 30C is a third figure for explaining an enlarged display manipulation in the combined image mode of the camera according to example 1 of the present invention.

Although FIG. 28 and FIG. 29 explained an enlarged display during the playing process, display enlargement may also be conducted during shooting or rec-view display. For example, when, as shown in FIG. 30, an enlarging manipulation made by a user has been detected in the combined image mode, the live view image may be enlarged. By thus displaying the live view image in an enlarged state, it is possible to provide users with an environment in which users can easily concentrate on shooting.

Also, while display enlargement, etc., was possible only for a still image in FIG. 9, it is also possible to conduct display enlargement, display enlargement position changing, display frame changing, etc. similarly for a video image.

As described above, in the camera 1 according to the present example, when the manipulation unit 123 has received a shooting instruction via the display area displaying the live view image being touched or by other means, the frame images are obtained and the display area displaying the live view image is automatically switched.

Also, when the manipulation unit 123 has received a cancellation instruction via a display area displaying a frame image being touched or by other means, the frame image is cancelled and the live view image is displayed for retaking. Also, when image data of a combined image is generated, each frame image that is a constituent of the combined image is corrected on the basis of the results of comparison with other frame images and an excellent combined image can be obtained. Therefore, according to the camera 1 of the present example, image data of a desired combined image can be easily generated by a simple manipulation. Also, because image data of a desired combined image can be easily generated by a simple manipulation, this makes it possible for users to maintain a strong motivation to generate a combined image.

Example 2

Figure 32:
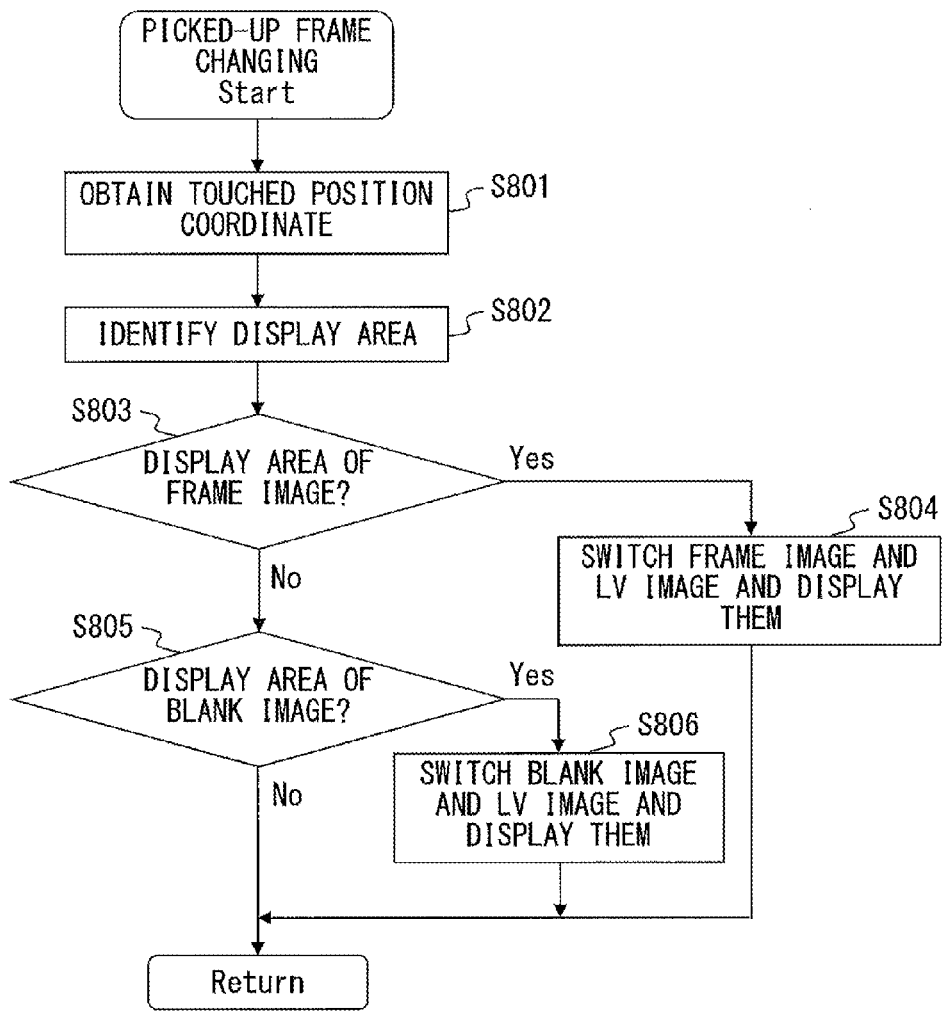
FIG. 32 is a flowchart showing a picked-up frame changing process of the camera according to example 2 of the present invention.
Figure 33A:
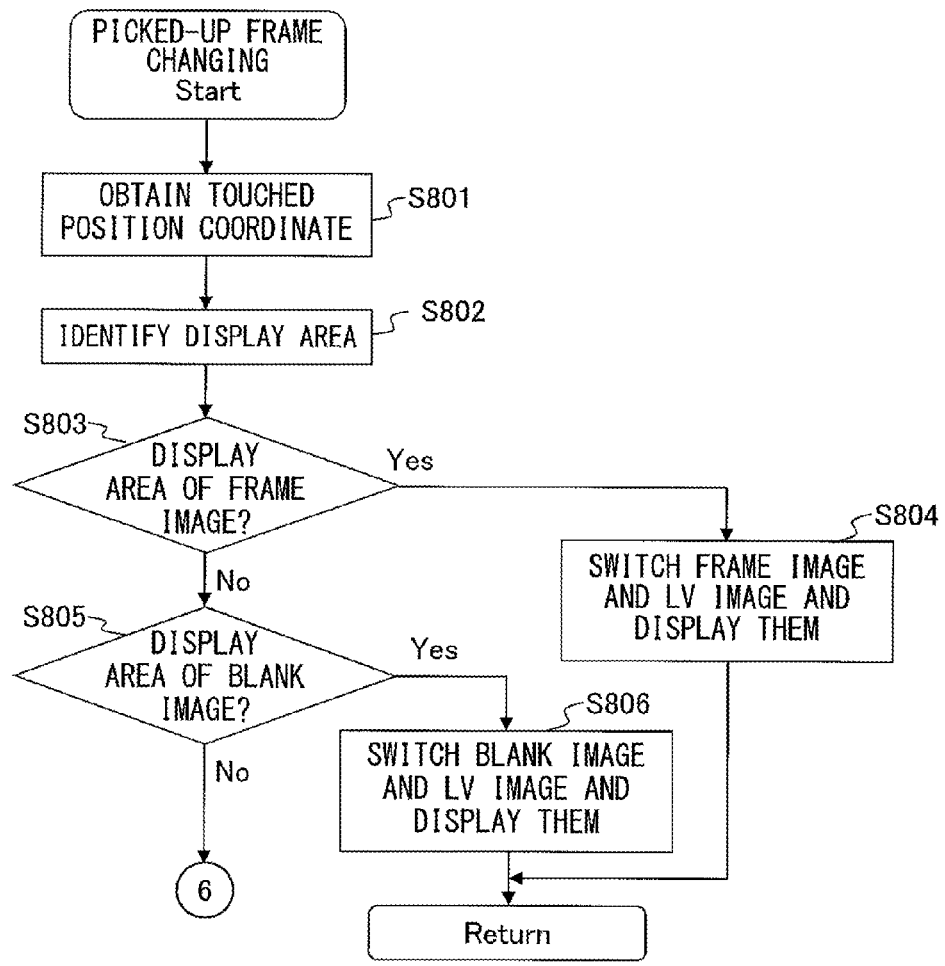
FIG. 33A is another flowchart (Part 1) showing the picked-up frame changing process of the camera according to example 2 of the present invention.
Figure 33B:
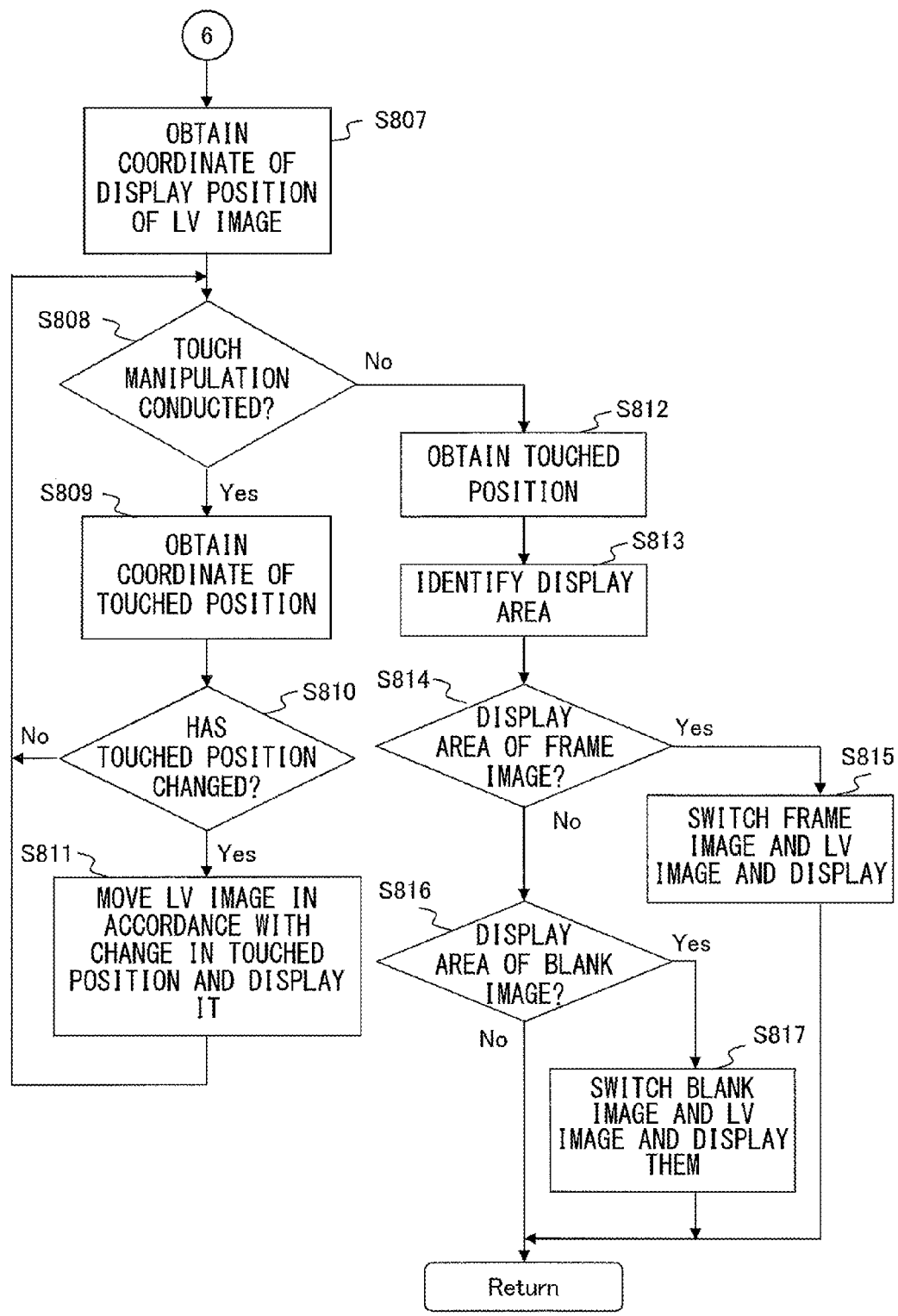
FIG. 33B is another flowchart (Part 2) showing the picked-up frame changing process of the camera according to example 2 of the present invention.

FIG. 31 is a flowchart explaining a combined image manipulation process according to a camera according to the present example. FIG. 32 is a flowchart explaining a picked-up frame changing process of the camera according to the present example. FIG. 33 (FIG. 33A and FIG. 33B) is a different flowchart explaining the picked-up frame changing process of the camera according to the present example. FIG. 34 explains a picked-up frame changing manipulation of the camera according to the present example. FIG. 35 is a different figure for explaining the picked-up frame changing manipulation of the camera according to the present example. By referring to FIG. 31 through FIG. 35, processes executed for the camera according to the present example will be described with explanations given mainly for points different from the processes executed in the camera 1 according to example 1. Note that the camera according to the present example has a physical configuration similar to that of the camera 1 according to example 1 exemplified in FIG. 1.

As shown in FIG. 31, when the combined image manipulation process of the camera according to the present example has been started, the manipulation that started the combined image manipulation process is identified similarly to the case of the combined image manipulation process of the camera 1 exemplified in FIG. 8 according to example 1. However, in the camera according to the present example, it is not determined whether or not a cancellation manipulation or a restoration manipulation has been conducted, differently from the camera 1 according to example 1, even though the microcomputer 121 does determine whether or not a picked-up frame changing manipulation, a temporary storage manipulation or a temporary storage reading manipulation has been conducted (step S641, step S619 and step S625). This is because the camera according to the present example does not receive a cancellation manipulation or a restoration manipulation.

Note that accompanying this, the camera according to the present example also does not determine whether or not the cancellation manipulation shown in FIG. 7 has been conducted.

The determination of whether or not the picked-up frame changing manipulation in step S641 has been conducted is made not only on the basis of a touch manipulation on a display area not displaying an image but also on just whether or not the touch input unit 124 has detected a touch manipulation on a display area. When a touch manipulation on a display area has been detected, the microcomputer 121 executes the picked-up frame changing process, i.e., a process of displaying the live view image in the touched display area by switching the display area for displaying the live view image (step S800). Note that the picked-up frame changing manipulation in the camera of the present example is an example of a manipulation for giving the display position changing instruction.

The subsequent processes (from step S619 to step S635) are similar to those in the combined image manipulation process of the camera 1 according to example 1 shown in FIG. 8, and thus the explanations thereof will be omitted.

Next, by refereeing to FIG. 32, the picked-up frame changing process shown in FIG. 31 will be explained in more detail.

As shown in FIG. 32, when the picked-up frame changing process has been started, the microcomputer 121 obtains the coordinate data of the touched position on which the touch manipulation has been conducted in a display area (step S801), and identifies the display area on which the touch manipulation has been conducted on the basis of that coordinate data (step S802). Then, the microcomputer 121 determines whether or not the identified display area is a display area for a frame image (step S803).

When the identified display area is a display area for a frame image, the microcomputer 121 switches the frame image and the live view image and displays them (step S804). In other words, a frame image being displayed in the touched display area and the live view image being displayed in a different display area are switched and displayed. This is conducted by for example switching the coordinate data representing the display scope for the frame image and the coordinate data representing the display scope for the live view image. When step S804 is terminated, the picked-up frame changing process is terminated.

When the identified display area is not a display area for a frame image, the microcomputer 121 determines whether or not the identified display area is a display area for a blank image (step S805).

When the identified display area is a display area for a blank image, the microcomputer 121 switches the blank image and the live view image and display them as shown in for example FIG. 18 (step S806). In other words, the blank image being displayed in the touched display area and the live view image being displayed in a different display area are switched and are displayed. This is conducted by switching the coordinate data representing the display scope of the blank image and the coordinate data representing the display scope of the live view image.

Note that a blank image is an image in which nothing is displayed, and is for example an image colored in black entirely, an image colored in blue entirely, etc. When step S806 has been terminated, the picked-up frame changing process is terminated.

When the identified display area is not a display area for a blank image, the microcomputer 121 terminates the picked-up frame changing process.

The picked-up frame changing process executed as above make it possible for users to freely change the display area for displaying the live view image through a touch manipulation.

Although the picked-up frame changing process shown in FIG. 32 is a process in which a touch manipulation changes the display area for displaying the live view image, it can also be conducted by a manipulation on for example the cross-shaped button, the OK button, etc. In such a case, the user selects a display area for displaying the live view image through a manipulation on the cross-shaped button, confirms the selection through a manipulation on the OK button, and thereby can change the display area for displaying the live view image to a desired display area.

Also, the picked-up frame changing process shown in FIG. 32 can be replaced by for example the picked-up frame changing process shown in FIG. 33.

The picked-up frame changing process shown in FIG. 33 is different from the picked-up frame changing process shown in FIG. 32 in the process executed when a display area that is a display area neither for a frame image nor a blank area has been identified.

Specifically, the fact that when the identified display area is a display area neither for a frame image (step S803) nor a blank image (step S805), i.e., when the identified display area is a display area for the live view image, the process proceeds to step S807 as shown in FIG. 33 is different from FIG. 32, and the microcomputer 121 obtains the coordinated data representing the display scope of the live view image (step S807). Then, the microcomputer 121 determines whether or not the touch input unit 124 has detected a touch manipulation on a display area, i.e., determines whether or not a touch manipulation on a display area has been continuously performed (step S808).

When the touch input unit 124 has detected a touch manipulation on a display area, i.e., when it has been determined that a touch manipulation on a display area has been continuously performed, the microcomputer 121 obtains the coordinate data of the touched position at that moment (step S809), and determines whether or not the touched position has changed on the basis of the difference between that coordinate data and the coordinate data of the touched position obtained previously (step S810).

For example, when that difference is not zero, it is determined that the touched position has changed (step S811). When the touched position has changed, the microcomputer 121 moves the live view image in accordance with the change in the touched position and displays it (step S811). For example, the live view image is moved in the direction of the change and by the amount of the change in the touched position and is displayed. Then, the process returns to step S808. When the touched position has not changed even when the finger has been on the touch input unit 124, the process returns to step S808.

When the touch input unit 124 has not detected a touch manipulation on a display area, i.e., when it has been determined that the finger was detached from the touch input unit 124 and the touch manipulation on the display area has not been continuously performed, the microcomputer 121 obtains the coordinate data of the touched position at which the touch manipulation was last conducted in the display area (step S812), and identifies the display area on which the touch manipulation was last conducted (step S813). Then, the microcomputer 121 determines whether or not the identified display area is a display area for a frame image (step S814).

When the identified display area is a display area for a frame image, the microcomputer 121 switches the frame image and the live view image and displays them (step S815). In other words, the frame image being displayed in the display area on which the touch manipulation was last conducted and the live view image being displayed in a different display area are switched and displayed. When this has been terminated, the picked-up frame changing process is terminated.

When the identified display area is not a display area for a frame image, the microcomputer 121 determines whether or not the identified display area is a display area for a blank image (step S816).

When the identified display area is a display area for a blank image, the microcomputer 121 switches the blank image and the live view image and displays them (step S817). In other words, the blank image being displayed in the display area on which the touch manipulation was last conducted and the live view image being displayed in a different display area are switched and displayed. When this has been terminated, the picked-up frame changing process is terminated.

When the identified display area is not a display area for a blank image, the microcomputer 121 terminates the picked-up frame changing process.

The picked-up frame changing process executed as above also makes it possible for users to freely change the display area for displaying the live view image through a touch manipulation. As shown in for example the order in FIG. 34A through FIG. 34D, the user moves a finger from the upper left display area displaying the live view image to the upper right display area displaying a blank image with the finger touching the screen, and thereby can switch the live view image being displayed in the upper left display area and the blank image being displayed in the upper right display area. In other words, it is possible to change the display area for displaying the live view image from the upper left display area to the upper right display area.

In such a case, while the finger is moved while touching the screen, the live view image is moved accompanying the movement of the finger. Also, as shown in the order of for example FIG. 34A and FIG. 34E through FIG. 34G, the user can switch the live view image being displayed in the upper left display area and the blank image being displayed in the lower right display area by moving a finger from the upper left display area displaying the live view image to the lower right display area displaying the blank image, passing through the lower left display area with the finger touching the screen. In other words, it is possible to change the display area for displaying the live view image from the upper left display area to the lower right display area.

In this case as well, while the finger is moved while touching the screen, the live view image is moved accompanying the movement of the finger. Also, as shown in the order of for example FIG. 34H through FIG. 34K, the user can change the live view image being displayed in the upper right display area and the frame image being displayed in the upper left display area by moving a finger from the upper right display area displaying the live view image to the upper left display area displaying the frame image with the finger touching the screen. In other words, it is possible to change the display area for displaying the live view image from the upper right display area to the upper left display area.

In this case as well, while the finger is moved while touching the screen, the live view image is moved accompanying the movement of the finger. Note that the images denoted by "LV" represent live view images and the gray images represent blank images in FIG. 34A through FIG. 34K (as well as FIG. 35A through FIG. 35K that will be described later). "LV" may be actually displayed as an icon for telling users that the image is the live view image but it is not necessary to display "LV".

Note that, in the picked-up frame changing process shown in FIG. 33, while the user moves a finger touching the live view image, the live view image is moved accompanying and together with the movement of the finger; however, it is also possible to alter this process during this movement as shown in for example FIG. 35A through FIG. 35K.

As shown in the order in FIG. 35A through FIG. 35D, when the user is moving a finger from the upper left display area displaying the live view image to the upper right display area displaying a blank image with the finger touching the screen, the live view image being displayed in the upper left display area that has been touched and a blank image being displayed in the touched upper right display area are switched at a moment when the touched display area has changed, i.e., when the touched display area has changed from the upper left display area to the upper right display area. Accordingly, in such a case, while the finger is moved while touching the screen, the live view image is not moved accompanying the movement of the finger in the order shown in FIG. 34A through FIG. 34D.

Also, as shown in the order in FIG. 35A and FIG. 35E through FIG. 35G, when the user moves a finger from the upper left display area displaying the live view image to the lower right display area displaying a blank image passing through the lower left display area as well, the live view image being displayed in the upper left display area that has been touched and the blank image displayed in the touched lower left display area are switched at a moment when the touched display area has changed, i.e., when the touched display area has changed from the upper left display area to the lower left display area, and thereafter when the touched display area has changed from the lower left display area to the lower right display area, the live view image being displayed in the lower left display area that has been touched and the blank image being displayed in the touched lower right display area are switched. Accordingly, in such a case, while a finger is moved while touching the screen, the live view image is not moved accompanying the movement of the finger in the order shown in FIG. 34A and FIG. 34E through FIG. 34G.

Also, as shown in the order shown in FIG. 35H through FIG. 35K, when the user moves a finger from the upper right display area displaying the live view image to the upper left display area displaying a frame image with the finger touching the screen, the live view image being displayed in the upper right display area that has been touched and the frame image being displayed in the touched upper left display area are switched at a moment when the touched display area changes, i.e., when the touched display area changes from the upper right display area to the upper left display area. Accordingly, in this case, while a finger is moved while touching the screen, the live view image is not moved accompanying and together with the movement of the finger in the order shown in FIG. 34H through FIG. 34K.

As described above, according to the camera of the present example, it possible to freely change the display area for displaying the live view image through a touch manipulation when a combined image is generated, making it easy to change the arrangement positions of images constituent of a desired combined image through a simple manipulation.

Note that a digital camera has been used as an example of an image pickup device in the above explanations; however, the above technique can also be applied to a mobile phone (smartphone) having a camera, a tablet device and other mobile devices in addition to a camera dedicated device.

The above examples are specific examples of the present invention for facilitating the understanding of the invention, and the invention is not limited to these examples. Regarding the image pickup device according to the present invention, various modifications and changes are possible without departing from the spirit of the invention defined in the claims.

As described above, according to the present invention, it is possible to provide a technique for easily changing the arrangement positions of images constituting a desired combined image through a simple manipulation.

What is claimed is:

1. An image pickup device comprising:
   a display unit including a plurality of display areas;
   a touch panel associated with the plurality of display areas of the display unit;
   a first reception unit that receives a shooting instruction in response to a touch on a portion of the touch panel associated with a live view image displayed in one display area of the plurality of display areas;
   a second reception unit that receives a display position changing instruction specifying a display area of the display unit in response to a touch on a portion of the touch panel associated with an image that is different from the live view image displayed in the one display area of the plurality of display areas;
   an image pickup unit that obtains an image by picking up the image of a subject;
   a display control unit that controls the display unit so that an image displayed in one of the plurality of display areas is changed from a live view image to an image obtained by the image pickup unit in accordance with a shooting instruction when the first reception unit has received the shooting instruction and so that an image displayed in a display area specified by the display position changing instruction is changed to a live view image when the second reception unit has received the display position changing instruction; and
   an image process unit that analyzes a color distribution and a luminance distribution of image data of a plurality of images being displayed in the plurality of display areas, that synthesizes the image data after adjusting a color and a luminance of the plurality of images in accordance with a result of the analyzing, and that generates image data of a combined image in which the plurality of images are laid out as displayed in the display unit.

2. The image pickup device according to claim 1, wherein a display area specified by the display position changing instruction is a display area that is displaying a blank image.

3. The image pickup device according to claim 1, wherein a display area specified by the display position changing instruction is a display area displaying an image obtained by the image pickup unit in accordance with the shooting instruction, and
   the display control unit controls the display unit so that an image displayed in a display area specified by the display position changing instruction is changed to a live view image and an image displayed in a display area that was displaying the live view image before the change is changed to an image obtained by the image pickup unit in accordance with the shooting instruction when the second reception unit has received the display position changing instruction.

4. An image processing method comprising:
   a step of displaying a live view image in at least one display area of a plurality of display areas that a display unit includes;
   a step of receiving a shooting instruction in response to a touch on a portion of a touch panel associated with a live view image displayed in one display area of the at least one display area, the touch panel being associated with the plurality of display areas of the display unit;

a step of obtaining an image of a subject in accordance with the shooting instruction;

a step of changing an image displayed in one of the one or a plurality of display areas from a live view image to an image obtained in accordance with the shooting instruction;

a step of receiving a display position changing instruction specifying a display area of the display unit in response to a touch on a portion of the touch panel associated with an image that is different from the live view image displayed in the one display area of the plurality of display areas;

a step of changing an image displayed in a display area specified by the display position changing instruction to a live view image; and a step of analyzing a color distribution and a luminance distribution of image data of a plurality of images being displayed in a plurality of display areas of the display unit, of synthesizing the image data after adjusting a color and a luminance of the plurality of images in accordance with a result of the analyzing, and of generating image data of a combined image in which the plurality of images are laid out as displayed in the display unit.

5. A non-transitory computer-readable recording medium storing an image processing program that causes a computer provided with a display unit including a plurality of display areas and a touch panel associated with the plurality of display areas of the display unit to execute:

a step of displaying a live view image in one or a plurality of display areas of the display unit;

a step of receiving a shooting instruction in response to a touch on a portion of the touch panel associated with a live view image displayed in one display area of the at least one display area;

a step of obtaining an image of a subject in accordance with the shooting instruction;

a step of changing an image displayed in one of the one or a plurality of display areas from a live view image to an image obtained in accordance with the shooting instruction;

a step of receiving a display position changing instruction specifying a display area of the display unit in response to a touch on a portion of the touch panel associated with an image that is different from the live view image displayed in the one display area of the plurality of display areas;

a step of changing an image displayed in a display area specified by the display position changing instruction to a live view image; and a step of analyzing a color distribution and a luminance distribution of image data of a plurality of images being displayed in a plurality of display areas of the display unit, of synthesizing the image data after adjusting a color and a luminance of the plurality of images in accordance with a result of the analyzing, and of generating image data of a combined image in which the plurality of images are laid out as displayed in the display unit.

6. An image pickup device comprising:
a display unit including a plurality of display areas;
a first reception unit that receives a shooting instruction;
a second reception unit that receives a display position changing instruction specifying a display area of the display unit;
an image pickup unit that obtains an image by picking up the image of a subject;
a display control unit that controls the display unit so that an image displayed in one of the plurality of display areas is changed from a live view image to an image obtained by the image pickup unit in accordance with a shooting instruction when the first reception unit has received the shooting instruction and so that an image displayed in a display area specified by the display position changing instruction is changed to a live view image when the second reception unit has received the display position changing instruction; and
an image process unit that analyzes a color distribution and a luminance distribution of image data of a plurality of images being displayed in the plurality of display areas, that synthesizes the image data after adjusting a color and a luminance of the plurality of images in accordance with a result of the analyzing, and that generates image data of a combined image in which the plurality of images are laid out as displayed in the display unit.

7. The image pickup device according to claim 6, wherein a display area specified by the display position changing instruction is a display area that is displaying a blank image.

8. The image pickup device according to claim 6, wherein a display area specified by the display position changing instruction is a display area displaying an image obtained by the image pickup unit in accordance which the shooting instruction, and the display control unit controls the display unit so that an image displayed in a display area specified by the display position changing instruction is changed to a live view image and an image displayed in a display area that was displaying the live view image before the change is changed to an image obtained by the image pickup unit in accordance with the shooting instruction when the second reception unit has received the display position changing instruction.

9. An image processing method comprising:
a step of displaying a live view image in one or a plurality of display areas of a display unit;
a step of receiving a shooting instruction;
a step of obtaining an image of a subject in accordance with the shooting instruction;
a step of changing an image displayed in one of the one or a plurality of display areas from a live view image to an image obtained in accordance with the shooting instruction;
a step of receiving a display position changing instruction specifying a display area of the display unit;
a step of changing an image displayed in a display area specified by the display position changing instruction to a live view image; and
a step of analyzing a color distribution and a luminance distribution of image data of a plurality of images being displayed in a plurality of display areas of the display unit, of synthesizing the image data after adjusting a color and a luminance of the plurality of images in accordance with a result of the analyzing, and of generating image data of a combined image in which the plurality of images are laid out as displayed in the display unit.

10. A non-transitory computer-readable recording medium storing an image processing program that causes a computer provided with a display unit including a plurality of display areas to execute:

a step of displaying a live view image in one or a plurality of display areas of the display unit;

a step of receiving a shooting instruction;

a step of obtaining an image of a subject in accordance with the shooting instruction;

a step of changing an image displayed in one of the one or a plurality of display areas from a live view image to an image obtained in accordance with the shooting instruction;

a step of receiving a display position changing instruction specifying a display area of the display unit;

a step of changing an image displayed in a display area specified by the display position changing instruction to a live view image; and a step of analyzing a color distribution and a luminance distribution of image data of a plurality of images being displayed in a plurality of display areas of the display unit, of synthesizing the image data after adjusting a color and a luminance of the plurality of images in accordance with a result of the analyzing, and of generating image data of a combined image in which the plurality of images are laid out as displayed in the display unit.

* * * * *